United States Patent
Kwack et al.

(10) Patent No.: US 12,156,318 B2
(45) Date of Patent: Nov. 26, 2024

(54) INDUCTION HEATING TYPE COOKTOP FOR ESTIMATING TEMPERATURE OF THIN FILM

(71) Applicant: LG Electronics Inc., Seoul (KR)

(72) Inventors: Younghwan Kwack, Seoul (KR); Jongseong Ji, Seoul (KR); Seongho Son, Seoul (KR); Seonho Jeon, Seoul (KR); Chuhyoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 17/006,464

(22) Filed: Aug. 28, 2020

(65) Prior Publication Data

US 2021/0259060 A1   Aug. 19, 2021

(30) Foreign Application Priority Data

Feb. 18, 2020 (KR) .................. 10-2020-0019908

(51) Int. Cl.
  *H05B 6/06*   (2006.01)
  *H05B 6/04*   (2006.01)
  *H05B 6/12*   (2006.01)

(52) U.S. Cl.
  CPC .............. *H05B 6/062* (2013.01); *H05B 6/04* (2013.01); *H05B 6/1245* (2013.01); *H05B 2206/022* (2013.01)

(58) Field of Classification Search
  CPC ........ H05B 6/062; H05B 6/1245; H05B 6/04; H05B 2206/022; H05B 2213/07
  See application file for complete search history.

(56) References Cited

U.S. PATENT DOCUMENTS

| | | |
|---|---|---|
| 6,770,857 B2 | 8/2004 | Hirota et al. |
| 2018/0148886 A1 | 5/2018 | Kalze et al. |
| 2020/0196400 A1* | 6/2020 | Nishikoori ............. H05B 6/062 |

FOREIGN PATENT DOCUMENTS

| | | | |
|---|---|---|---|
| DE | 10127051 | 12/2002 | |
| DE | 102015002201 | 8/2016 | |
| JP | H10214680 A * | 8/1998 | |
| JP | 2002056959 | 2/2002 | |
| JP | 2008311058 | 12/2008 | |
| JP | 5630495 | 11/2014 | |
| WO | WO-02100130 A2 * | 12/2002 | ........... H05B 6/1209 |

OTHER PUBLICATIONS

EP Extended European Search Report in European Appln. No. 20197704.8, dated Mar. 15, 2021, 5 pages.

\* cited by examiner

*Primary Examiner* — Dana Ross
*Assistant Examiner* — Kuangyue Chen
(74) *Attorney, Agent, or Firm* — Fish & Richardson P.C.

(57) ABSTRACT

An induction heating type cooktop includes: a case, a cover plate coupled to a top of the case and having an upper plate that is configured to support a target object, a thin film disposed on at least one of a top of the upper plate or a bottom of the upper plate, a working coil provided in the case and configured to inductively heat the thin film, a memory storing information on one or more correlations between a temperature of the thin film and a plurality of components of an equivalent circuit associated with the thin film, the plurality of components including an inductor component and a resistor component, and a controller configured to operate the working coil and determine estimated temperature information corresponding to the inductor component and the resistor component of the equivalent circuit.

12 Claims, 29 Drawing Sheets

INDUCTION HEATING TYPE COOKTOP FOR ESTIMATING TEMPERATURE OF THIN FILM

CROSS-REFERENCE TO RELATED APPLICATION

The present disclosure claims priority to and the benefit of Korean Patent Application No. 10-2020-0019908, filed on Feb. 18, 2020, the disclosure of which is incorporated herein by reference in its entirety.

TECHNICAL FIELD

The present disclosure relates to a cooktop for estimating a temperature of a thin film (or thin layer) without using a temperature sensor.

BACKGROUND

Various types of cookware may be used to cook food at home or at restaurants. For example, gas ranges may use gas as fuel to heat food. In some examples, cooking devices may heat a target heating object such as a pot and a cooking vessel using electricity instead of gas.

Methods for electrically heating a target heating object may include a resistive heating method and an induction heating method. In the electrical resistive heating method, a target heating object may be heated based on current flowing through a metal resistance wire or a non-metallic heating element, such as Silicon Carbide (SIC), to generate heat which is then transferred to the target heating object (e.g., a cooking vessel) through a heat dissipation or heat transfer. In the induction heating method, a target heating object may be heated by eddy current generated in the target heating object made of a metal material, using an electrical field generated around a coil when a high frequency power having a predetermined magnitude is applied to the coil.

The induction heating method may be applied to cooktops. In some cases, a cooktop using the induction heating method may only heat an object made of a magnetic material. For example, when an object made of a nonmagnetic material (for example, heat-resistant glass, porcelain, etc.) is disposed on the cooktop, the cooktop may not heat the nonmagnetic material object.

In some cases, an induction heating device may include a heating plate disposed between a cooktop and a nonmagnetic object to heat the object. However, the aforementioned device may have problems including a low heating efficiency of the heating plate, and a longer cooking time to heat ingredients contained in the nonmagnetic object.

In some cases, a hybrid cooktop may heat a nonmagnetic object through a radiant heater using an electrical resistive heating method, where a magnetic object disposed on the hybrid cooktop is heated through a working coil by induction. In some cases, the induction heating method is applied to such hybrid cooktops. However, the aforementioned method may have problems including a low output of the radiant heater, and a low heating efficiency. A user of the hybrid cooktop may experience inconvenience from considering a material of a target heating object when the user needs to place the target heating object on the cooktop.

In some cases, an all-metal cooktop may heat a metal object (e.g., a nonmagnetic metal and a magnetic object). However, such all-metal cooktop may not heat a nonmagnetic and non-metallic object. In addition, a heating efficiency may be lower than a radiant heater technology, and a material cost may be high.

SUMMARY

The present disclosure is directed to an induction heating type cooktop capable of heating both a magnetic material and a nonmagnetic material.

The present disclosure also is directed to an induction heating type cooktop for determining a temperature of a thin film by analyzing relationships between a temperature and inductor and resistor components of an equivalent circuit formed by an inductively heated object.

According to one aspect of the subject matter described in this application, an induction heating type cooktop includes a case, a cover plate coupled to a top of the case and having an upper plate that is configured to support a target object, a thin film disposed on at least one of a top of the upper plate or a bottom of the upper plate, a working coil provided in the case and configured to inductively heat the thin film, a memory storing information on one or more correlations between a temperature of the thin film and a plurality of components of an equivalent circuit associated with the thin film, the plurality of components including an inductor component and a resistor component, and a controller configured to operate the working coil and determine estimated temperature information corresponding to the inductor component and the resistor component of the equivalent circuit. The controller may be configured to determine an estimated temperature associated with the determined estimated temperature information as a current temperature of the thin film based on the information on the one or more correlations.

Implementations according to this aspect may include one or more of the following features. For example, the controller may be configured to determine the current temperature of the thin film after the working coil operating at a first frequency is controlled to operate at a preset second frequency to heat at least one of the thin film or the target object at a configured output level.

In some implementations, the controller may be configured, based on a predetermined time being elapsed while the working coil is operated at the first frequency, to control the working coil to be operated at the preset second frequency and determine the current temperature of the thin film. In some examples, the controller may be configured, based on a predetermined number of periods being elapsed while the working coil is operated by an input voltage, to control the working coil to be operated at the preset second frequency.

In some implementations, the controller may be configured to change a standby state, in which a predetermined current flows in the working coil, to a self resonance state and determine the current temperature of the thin film based on an attenuation width and a resonant frequency of current measured from the working coil in the self resonance state.

In some examples, the controller may be configured to determine the current temperature of the thin film based on the estimated temperature information corresponding to the inductor component determined based on the resonant frequency. In some examples, the controller may be configured to determine the current temperature of the thin film based on the estimated temperature information corresponding to the resistor component determined based on the attenuation width.

In some implementations, the controller may be configured to allow preset current having a constant value in the standby state to flow in the working coil. In some implementations, the controller may be configured to control the working coil to enter the self resonance state from the standby state before the working coil is operated at a frequency corresponding to a configured output level.

In some examples, the memory may be configured to store the information on the one or more correlations based on at least one of a thickness of the thin film or a frequency at which the working coil is operated.

In some implementations, the target object may be provided with a non-metal material. In some examples, a thickness of the thin film may be less than a skin depth of the thin film.

According to another aspect of the subject matter described in this application, a method of estimating a temperature of a thin film without using a temperature sensor is provided. The method may include storing, in a memory, information on one or more correlations between a temperature of the thin film and a plurality of components of an equivalent circuit associated with the thin film, the plurality of components including an inductor component and a resistor component, operating a working coil configured to inductively heat the thin film, determining estimated temperature information corresponding to the inductor component and the resistor component of the equivalent circuit, and determining an estimated temperature associated with the determined estimated temperature as a current temperature of the thin film based on the information on the one or more correlations.

Implementations according to this aspect may include one or more following features. For example, the method may further include determining the current temperature of the thin film after the working coil operating at a first frequency is controlled to operate at a preset second frequency to heat at least one of the thin film or a target object at a configured output level.

In some implementations, the method may further include controlling the working coil, based on a predetermined time being elapsed while the working coil is operated at the first frequency, to be operated at the preset second frequency and determining the current temperature of the thin film. In some examples, the method may further include controlling the working coil, based on a predetermined number of periods being elapsed while the working coil is operated by an input voltage, to be operated at the preset second frequency.

In some examples, the method may further include changing a standby state, in which a predetermined current flows in the working coil, to a self resonance state, and determining the current temperature of the thin film based on an attenuation width and a resonant frequency of current measured from the working coil in the self resonance state. In some examples, the method may further include determining the current temperature of the thin film based on the estimated temperature information corresponding to the inductor component determined based on the resonant frequency.

In some implementations, the method may further include determining the current temperature of the thin film based on the estimated temperature information corresponding to the resistor component determined based on the attenuation width. In some examples, the method may further include allowing preset current having a constant value in the standby state to flow in the working coil.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
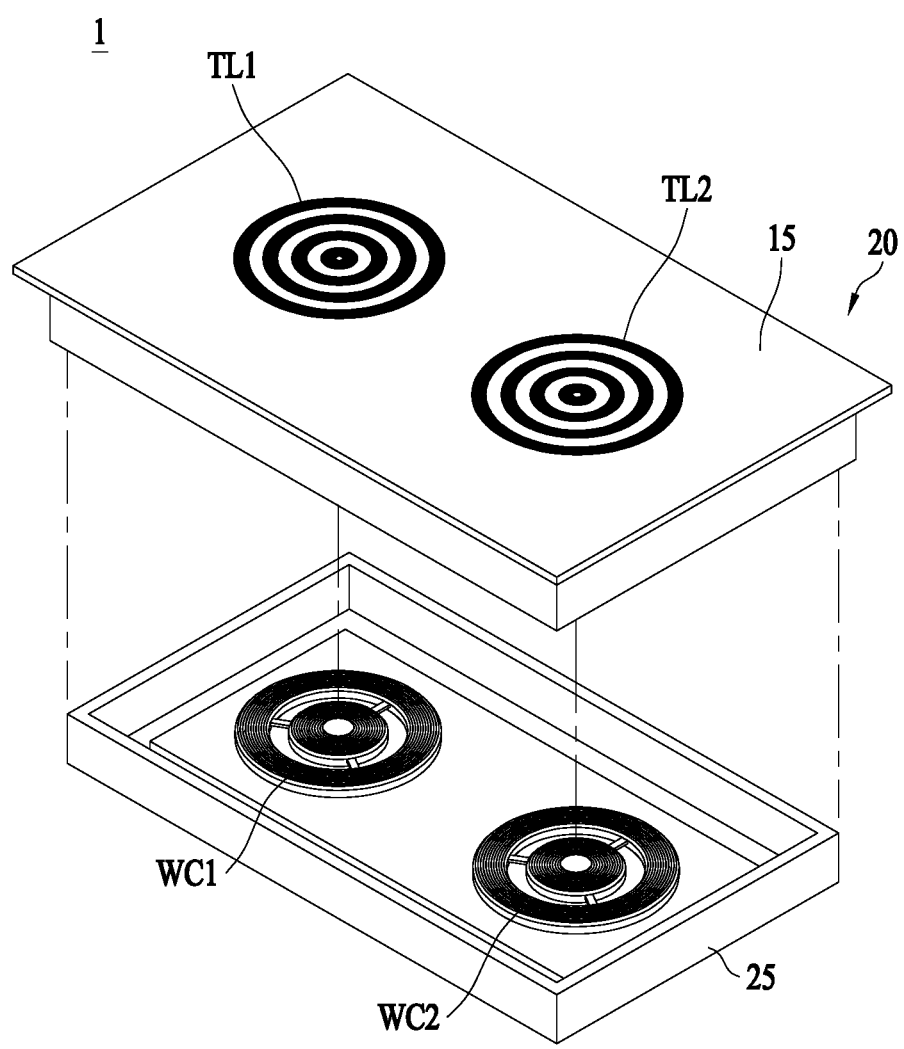
FIG. 1 is a diagram illustrating an example of an induction heating type cooktop.

FIG. 1 is a diagram illustrating an example of an induction heating type cooktop.

Referring to FIG. 1, an induction heating type cooktop 1 may include a case 25, a cover plate 20, working coils WC1 and WC2, and thin films TL1 and TL2. The working coils WC1 and WC2 may be installed in the case 25.

In some implementations, various devices may be disposed in the case 25 and configured to actuate the working coils WC1 and WC2. For example, the devices for actuating the working coils may include a power unit for providing alternating current power, a rectifying unit for rectifying the alternating current power from the power unit to direct current power, an inverter for inverting the direct power rectified by the rectifying unit to a resonance current through a switching operation, a control unit for controlling operations of the various devices in the induction heating type cooktop 1, a relay or a semi-conductor switch for turning on and off a working coil, and other suitable parts.

The cover plate 20 may be coupled to a top of the case 25, and may include an upper plate 15 for placing a target object to be heated on the top. For example, the cover plate 20 may include the upper plate 15 for placing a target object to be heated, such as a cooking vessel. In some implementations, the upper plate 15 may be made of a glass material (e.g., ceramic glass).

In some implementations, an input interface may be provided in the upper plate 15 to receive an input from a user and transmit the received input to a control part of the input interface. The input interface may be provided at a position other than the upper plate 15.

The input interface can be configured to allow a user to input a desired heat intensity or an operation time of the induction heating type cooktop 1. The input interface may be implemented in various forms, such as a mechanical button or a touch panel. The input interface may include, for example, a power button, a lock button, a power control button (e.g., "+", "−", etc.), a timer control button (e.g., "+", "−", etc.), a charging mode button, and other suitable buttons. The input interface may transmit an input provided by a user to a control part of the input interface, and the control part of the input interface may transmit the input to the aforementioned control unit of the induction heating type cooktop 1. The aforementioned control unit may control operations of various devices (e.g., a working coil) based on the input (e.g., a user input) provided from the control part of the input interface. In some implementations, the control part may include a controller, a processor, or an electric circuit.

The upper plate 15 may display a status of the working coils WC1 and WC2 and intensities of heating corresponding to thermal power. For example, an indicator providing a fire hole shape may be displayed in the upper plate 15, the indicator including a plurality of light emitting devices (e.g., light emitting diodes (LEDs)) disposed in the case 25.

The working coils WC1 and WC2 may be installed inside the case 25 to heat a target heating object. For example, the aforementioned control unit can be configured to driver the working coils WC1 and WC2. By way of further example, when the target heating object is positioned on the upper plate 15, the working coils WC1 and WC2 may be driven by the control unit.

In some implementations, the working coils WC1 and WC2 may directly heat a magnetic target heating object (e.g., a magnetic object) or indirectly heat a nonmagnetic target heating object (e.g., a nonmagnetic object) through the thin films TL1 and TL2.

The working coils WC1 and WC2 may heat a target heating object by employing an induction heating method. The working coils WC1 and WC2 may be disposed to overlap the thin films TL1 and TL2 in a longitudinal direction. For example, the working coils WC1 and WC2 can be disposed to overlap the thin films TL1 and TL2, respectively, in a vertical direction or an up-down direction.

While FIG. 1 illustrates that two working coils WC1 and WC2 are installed in the case 25, the present disclosure is not limited to the illustrated implementation. For example, one working coil or three or more working coils may be installed in the case 25.

The thin films TL1 and TL2 may be disposed (e.g., coated) on the upper plate 15 to heat a nonmagnetic object among target heating objects. For example, the thin films TL1 and TL2 may be disposed on a top surface or a bottom surface of the upper plate 15 and may be provided to overlap the working coils WC1 and WC2 in the longitudinal direction. The disposition of the thin films TL1 and TL2 may enable the induction heating type cooktop 1 to heat the corresponding target heating object, regardless of a position and a type of the target heating object.

In some implementations, the thin films TL1 and TL2 may have at least one of a magnetic property or a nonmagnetic property. For example, the thin films TL1 and TL2 may have either or both of the magnetic property and the nonmagnetic property.

In some implementations, the thin films TL1 and TL2 may be, for example, composed of a conductive material. As shown in FIG. 1, the thin films TL1 and TL2 may be disposed on a top surface of the upper plate 15 in a pattern such that a plurality of rings having different diameters is repeated (e.g., coaxially disposed). However, other configurations of the thin films are possible in other implementations. For example, the thin films TL1 and TL2 may include a material other than a conductive material and may be disposed on the upper plate 15 by taking a different form. Hereinafter, for the convenience of explanation, the thin films TL1 and TL2 are described as being made of a conductive material and disposed on the upper plate 15 in the form of a plurality of rings having different diameters.

In FIG. 1, two thin films TL1 and TL2 are presented, but the number of thin films included in the cooktop 1 is not limited thereto. For example, one thin film or three or more thin films may be coated. Further, the elements and dispositional relationship between the elements shown in FIG. 1 are for illustrative purposes, and therefore, the shapes, numbers, and positions of the elements should not be construed as being limited to the example shown in FIG. 1.

The specific features of the thin films TL1 and TL2 will be described in more detail herein.

Figure 2:
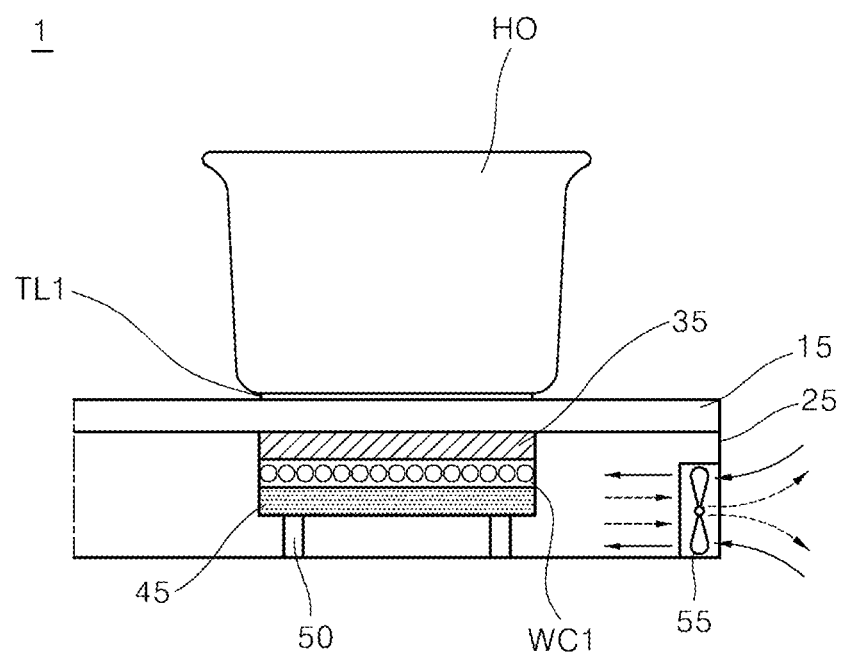
FIG. 2 is a diagram illustrating exemplary elements disposed in the induction heating type cooktop of FIG. 1.

FIG. 2 is a diagram illustrating exemplary elements provided inside the case 25 of the induction heating type cooktop 1 shown in FIG. 1. Referring to FIG. 2, the induction heating type cooktop 1 may further include an insulator 35, a shield plate 45, a support member 50, and a cooling fan 55.

In some implementations, elements (depicted in FIG. 2) disposed in the surroundings of the first working coil WC1 of FIG. 2 are identical to elements disposed in the surroundings of the second working coil WC2 of FIG. 1. For the convenience of explanation, the elements (e.g., the first thin film TL1, the insulator 35, the shield plate 45, the support member 50, and the cooling fan 55) in the surroundings of the first working coil WC1 will be described.

The insulator 35 may be provided between a bottom surface of the upper plate 15 and the first working coil WC1. For example, the insulator 35 may be mounted to a cover plate 20 (e.g., the cover plate 20 of FIG. 1) or the bottom of the upper plate 15. The first working coil WC1 may be disposed below the insulator 35.

The insulator 35 may block heat that is generated when the first thin film TL1 or a target heating object HO is heated upon driving of the first working coil WC1. The insulator 35 may prevent the generated heat from being transferred to the first working coil WC1.

For example, when the first thin film TL1 or the target heating object HO is heated by electromagnetic induction of the first working coil WC1, the heat of the first thin film TL1 or the target heating object HO may be transferred to the upper plate 15 and the transferred heat may be further transferred to the first working coil WC1 to thereby causing a damage to the first working coil WC1. The insulator 35 may prevent the damage of the first working coil WC1 by blocking the heat from being transferred to the first working coil WC 1 and further prevent a degradation of heating performance of the first working coil WC1.

In some implementations, a spacer may be installed between the first working coil WC1 and the insulator 35. For example, the spacer may be inserted between the first working coil WC1 and the insulator 35, so that the first working coil WC1 and the insulator 35 do not directly contact each other. The spacer may block heat that is generated when the first thin film TL1 and the target heating object HO are heated upon a driving of the first working coil WC1. The spacer may block the generated heat such that the generated heat is prevented from being transferred to the first working coil WC1 through the insulator 35.

The spacer may perform the same or similar function as the insulator 35, thus the spacer may allow using the insulator 35 having a smaller thickness and reducing a gap between the target heating object HO and the first working coil WC1.

In some implementations, a plurality of spacers may be provided, and the plurality of spacers may be disposed to be spaced apart from each other in the gap between the first working coil WC1 and the insulator 35. The spacers may guide air suctioned into the case 25 by the cooling fan 55 to the first working coil WC1. For example, the spacers may guide air, introduced into the case 25 by the cooling fan 55, to be properly transferred to the first working coil WC1, thereby improving cooling efficiency of the first working coil WC1.

The shield plate 45 may be mounted to a bottom of the first working coil WC1 to block a magnetic field from the first working coil WC1. For example, the shield plate 45 may block the magnetic field from the first working coil WC1 and the support member may support the shield plate 45.

The support member 50 may be installed between a bottom surface of the shield plate 45 and a bottom surface of the case 25 to support the shield plate 45. For example, by supporting the shield plate 45, the support member 50 may indirectly support the insulator 35 and the first working coil WC1. The support provided by the support member 50 may enable the insulator 35 to be brought into tight contact with the upper plate 15 and to maintain a constant gap between the first working coil WC1 and the target heating object HO.

The support member 50 may include, for example, an elastic object (e.g., a spring) to support the shield plate 45, but aspects of the present disclosure are not limited thereto. In some implementations, the support member 50 may be removed from the induction heating type cooktop 1.

The cooling fan 55 may be installed inside the case 25 to cool the first working coil WC1. For example, the aforementioned control unit may provide the cooling fan 55 and the cooling fan 55 may be installed at a side wall of the case 25. In some implementations, the cooling fan 55 may be installed at a position other than the side wall of the case 25.

The cooling fan 55 may perform a suction of ambient air from the outside of the case 25, as shown in FIG. 2, and transfer the suctioned air to the first working coil WC1. In some implementations, the cooling fan 55 may draw interior air (e.g., heated air) of the case 25 and discharge the air to the outside of the case 25. Accordingly, the cooling fan 55 may enable the induction heating type cooktop 1 to cool internal elements (e.g., first working coil WC1) of the case 25 efficiently.

In some implementations, the ambient air transferred from the outside of the case 25 to the first working coil WC1 by the cooling fan 55 may be further guided to the first working coil WC1 by the spacer. The guided air may enable the induction heating type cooktop 1 to directly and efficiently cool the first working coil WC1, thereby improving a durability of the first working coil WC1. For example, the durability of the induction heating type cooktop 1 may be improved by preventing a thermal damage.

In some implementations, the induction heating type cooktop 1 may include one or more of the above-described features and configurations. Hereinafter, exemplary features and configurations of the aforementioned thin film will be described in more detail with reference to FIGS. 3 to 6.

Figure 3:
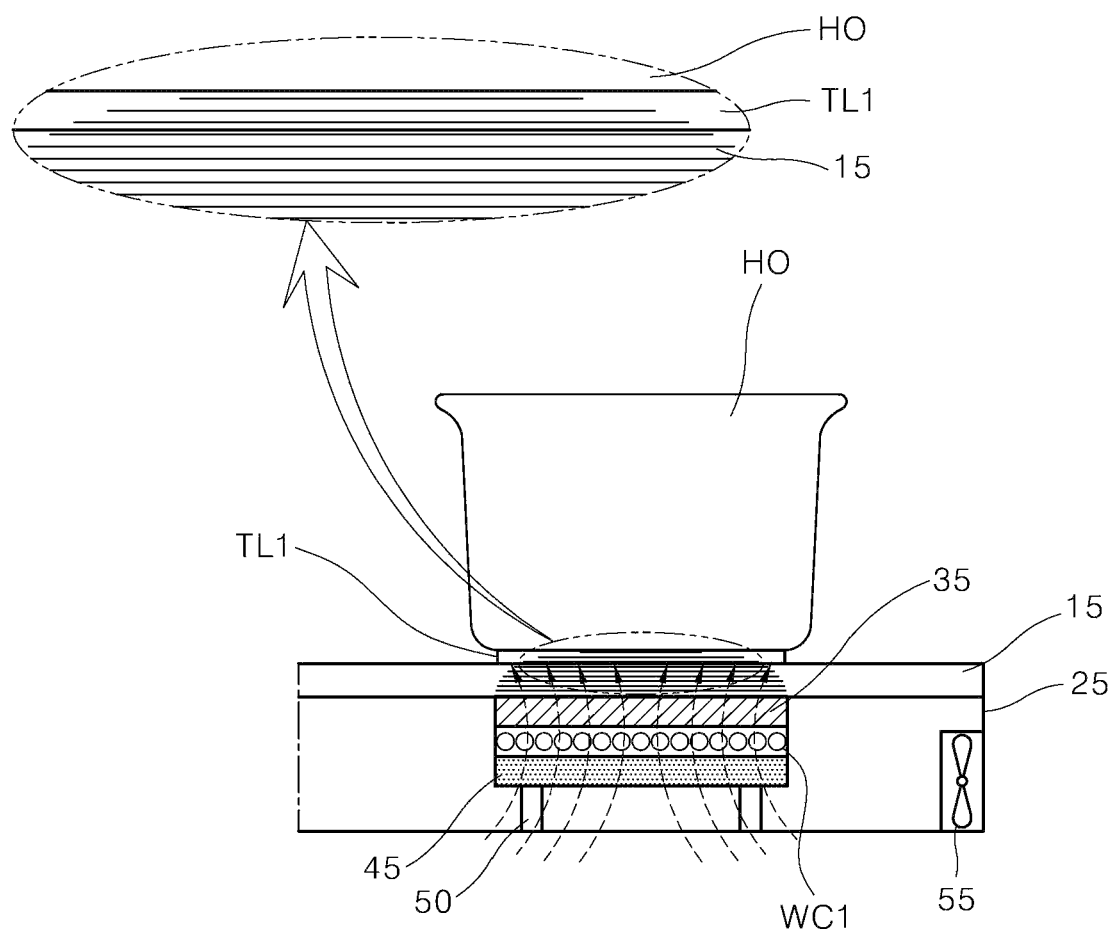
FIGS. 3 and 4 are diagrams illustrating examples of a thickness of a thin film and a skin depth of the thin film of the induction heating type cooktop of FIG. 1.
Figure 4:
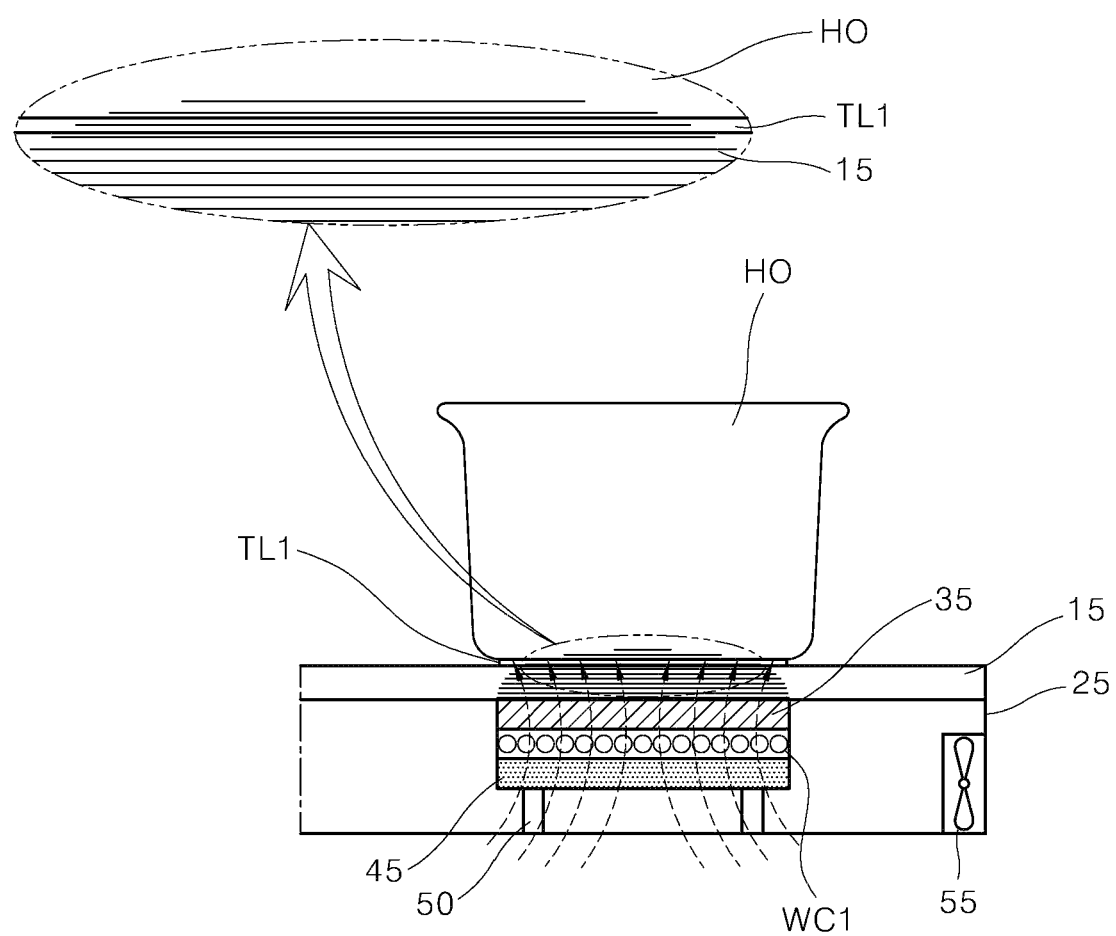
Figure 5:
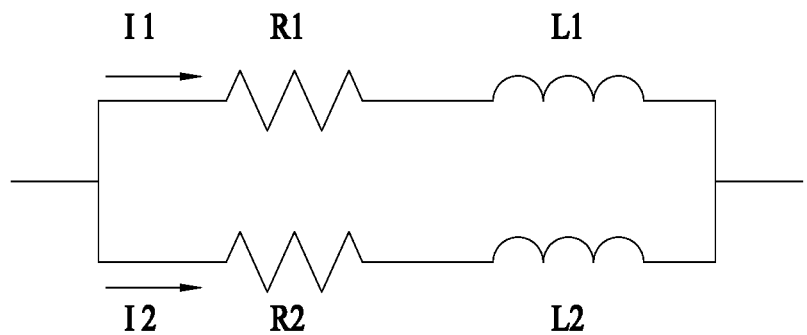
FIGS. 5 and 6 are diagrams illustrating examples of an electric impedance between a thin film and a target heating object based on a type of the target heating object.
Figure 6:
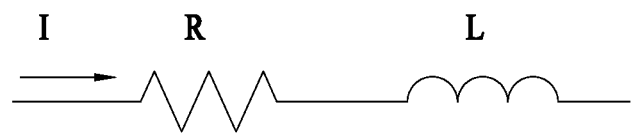

FIGS. 3 and 4 are diagrams illustrating a relation between a thickness and a skin depth of a thin film. FIGS. 5 and 6 are diagrams illustrating a variation of impedance between a thin film and a target heating object depending on a type of the target heating object.

The first thin film TL1 and the second thin film TL2 may have similar technical features, and the thin film TL1 and TL2 may be disposed on the top surface or the bottom surface of the upper plate 15. Hereinafter, for the convenience of explanation, the first thin film TL1 disposed on the top surface of the upper plate 15 will be described as an example.

In some implementations, the first thin film TL1 may include a material having a relatively low permeability. For example, since the first thin film TL1 has a relatively low permeability, the skin depth of the first thin film TL1 may be deep. The skin depth may refer to a depth by which a current can penetrate a material surface, and the relative permeability may be disproportional to the skin depth. Accordingly, the skin depth of the first thin film TL1 may be deeper as the relative permeability of the first think film TL1 gets lower.

In some implementations, the skin depth of the first thin film TL1 may have a value greater than a value corresponding to a thickness of the first thin film TL1. That is, since the first thin film TL1 has a thin thickness (e.g., a thickness of 0.1 μm~1,000 μm) and a skin depth of the first thin film TL1 is greater than the thickness of the first thin film TL1, a magnetic field from the first working coil WC1 may pass through the first thin film TL1 and then transfer to the target heating object HO. The transferred magnetic field may induce eddy current to the target heating object HO.

For example, as illustrated in FIG. 3, when the skin depth of the first thin film TL1 is narrower than the thickness of the first thin film TL1, the magnetic field generated by the first working coil WC1 may have difficulties reaching the target heating object HO.

In some implementations, as illustrated in FIG. 4, when the skin depth of the first skin depth TL1 is deeper than the thickness of the first thin film TL1, most of the magnetic field generated by the first working coil WC1 may be transferred to the target heating object HO. Because the skin depth of the first thin film TL1 is deeper than the thickness of the first thin film TL1, the magnetic field generated by the first working coil WC1 may pass through the first thin film TL1 and most of the magnetic field energy may be dissipated in the target heating object HO. Accordingly, the target heating object HO may be heated primarily.

The thin film TL1 may have a resistance value that allows the first thin film TL1 to be heated by the first working coil WC1. For example, the thickness of the first thin film TL1 may be disproportional to the resistance value of the first thin film TL1 (e.g., a sheet resistance value). By way of further example, the resistance value of the first thin film TL1 increases as the first thin film TL1 gets narrower. A property of the first thin film TL1 may change, based on its shallow disposition on the upper plate 15, to a load resistance capable of heating an object placed on the upper plate 15. In some implementations, the first thin film TL1 may have a thickness of, for example, 0.1 μm to 1,000 μm, but not limited thereto.

In some implementations, the first thin film TL1 can be configured to heat a nonmagnetic object. In some implementations, an impedance property between the first thin film TL1 and the target heating object HO may vary according to whether the target heating object HO is a magnetic object or a nonmagnetic object.

One or more examples, where the target heating object is a magnetic object, will be described in the following.

Referring to FIGS. 2 and 5, when the first working coil WC1 is driven while a magnetic target heating object HO is positioned on the top of the upper plate 15, a resistance component R1 (in FIG. 5) and an inductor component L1 (in FIG. 5) of the magnetic target heating object HO may form an equivalent circuit to that of a resistance component R2 and an inductor component L2 of the first thin film TL1.

In the equivalent circuit, an impedance (an impedance of R1 and L1) of the magnetic target heating object HO may be less than an impedance (, an impedance of R2 and L2) of the first thin film TL1. Accordingly, when the aforementioned equivalent circuit is formed, a magnitude of eddy current I1 applied to the magnetic target heating object HO may be greater than a magnitude of eddy current I2 applied to the first thin film TL1. More specifically, most of eddy current may be applied to the target heating object HO, thereby heating the target heating object HO. For example, when the target heating object HO is a magnetic object, the aforementioned equivalent circuit may be formed and most of eddy currents may be applied to the target heating object HO. Accordingly, the first working coil WC1 may directly heat the target heating object HO.

In some implementations, some of eddy current may be applied to the first thin film TL1, causing the first thin film TL1 to be heated slightly. Accordingly, the heated first thin film TL1 may secondarily heat the target heating object HO to a certain degree. However, a degree to which the target heating object HO is heated by the first thin film TL1 may not be significant when it is compared to a degree heated by the first working coil WC1.

One or more examples, where a target heating object is a nonmagnetic object, will be described in the following.

Referring to FIGS. 2 and 6, when the working coil WC1 is driven while a nonmagnetic target heating object HO is positioned on the top of the upper plate 15, an impedance may not exist in the nonmagnetic target heating object HO but may exist in the first thin film TL1 (e.g., the impedance depicted in FIG. 6). That is, a resistance component R and an inductor component L may exist only in the first thin film TL1. Accordingly, eddy current I (in FIG. 6) may be applied only to the first thin film TL1 and may not be applied to the nonmagnetic target heating object HO. More specifically, the eddy current I may be applied only to the first thin film TL1, thereby heating the first thin film TL1. For example, when the target heating object HO is a nonmagnetic object, the eddy current I may be applied to the first thin film TL1, thereby heating the first thin film TL1. Accordingly, the working coil WC1 may heat the first think film TL1 which may subsequently heat the nonmagnetic target heating object HO.

As described above, regardless of whether the target heating object HO is a magnetic object or a nonmagnetic object, the target heating object HO may be heated directly or indirectly by a single heating source which is the first working coil WC1. That is, when the target heating object HO is a magnetic object, the first working coil WC1 may primarily heat the target heating object HO, and, when the target heating object HO is a nonmagnetic object, the first thin film TL1 heated by the first working coil WC1 may heat the target heating object HO.

As described above, the induction heating type cooktop 1 may be capable of heating both a magnetic object and a nonmagnetic object. Thus, the induction heating type cooktop 1 may be capable of heating a target heating object regardless of a position and a type of the target heating object. Accordingly, without determining whether the target heating object is a magnetic object or a nonmagnetic object, a user is allowed to place the target heating object in any heating region on the top plate (e.g., upper plate 15), and therefore, a convenience of using the induction heating type cooktop 1 may improve.

In addition, the induction heating type cooktop 1 may directly or indirectly heat a target heating object using the single heating source (e.g., the first working coil WC1 or the second working coil WC2), and therefore, a heat plate or a radiant heater may not be required. Accordingly, using the single heating source may increase a heating efficiency and cut down a material cost.

Hereinafter, another exemplary induction heating type cooktop will be described.

Figure 7:
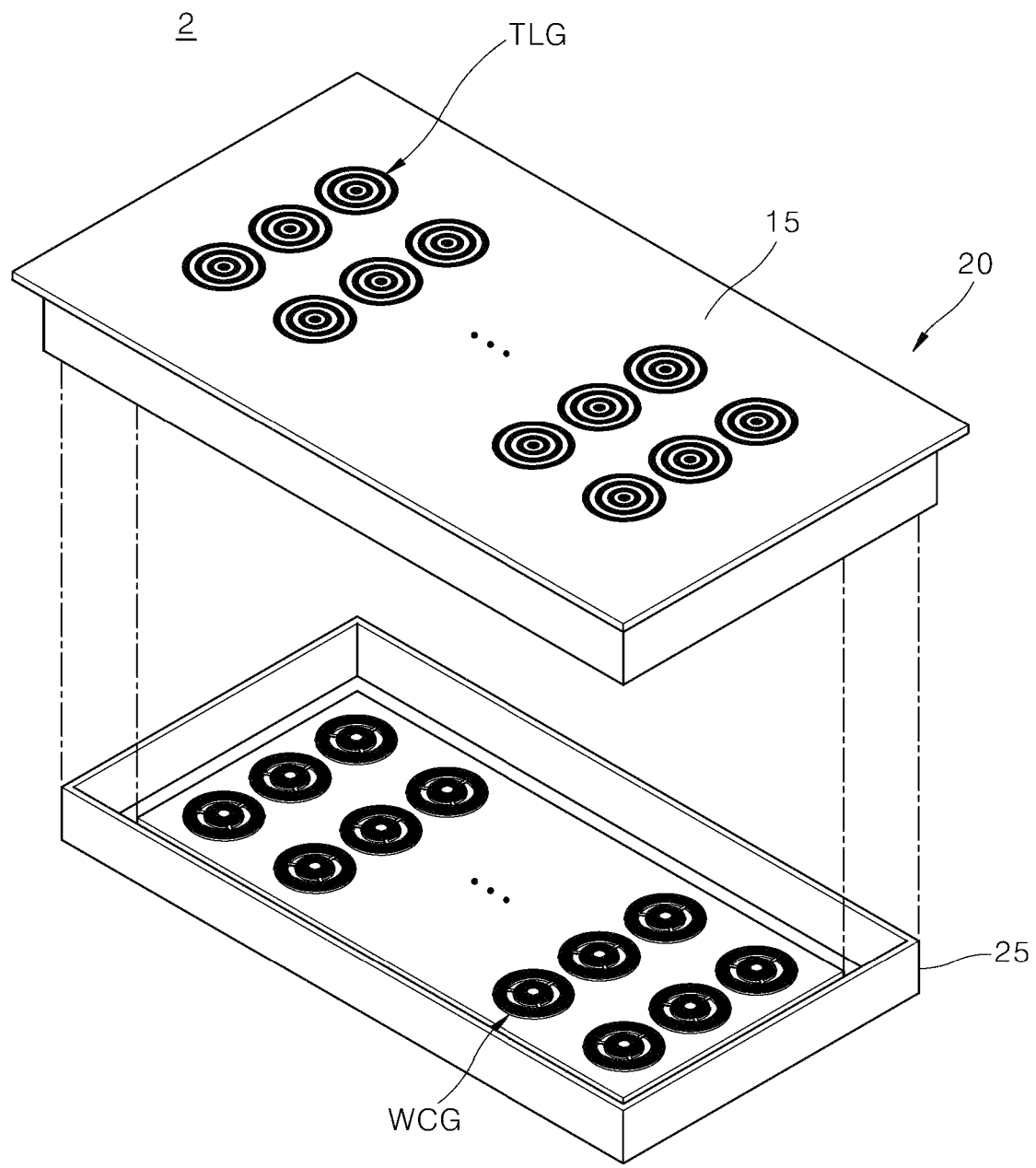
FIG. 7 is a diagram illustrating another example of an induction heating type cooktop.
Figure 8:
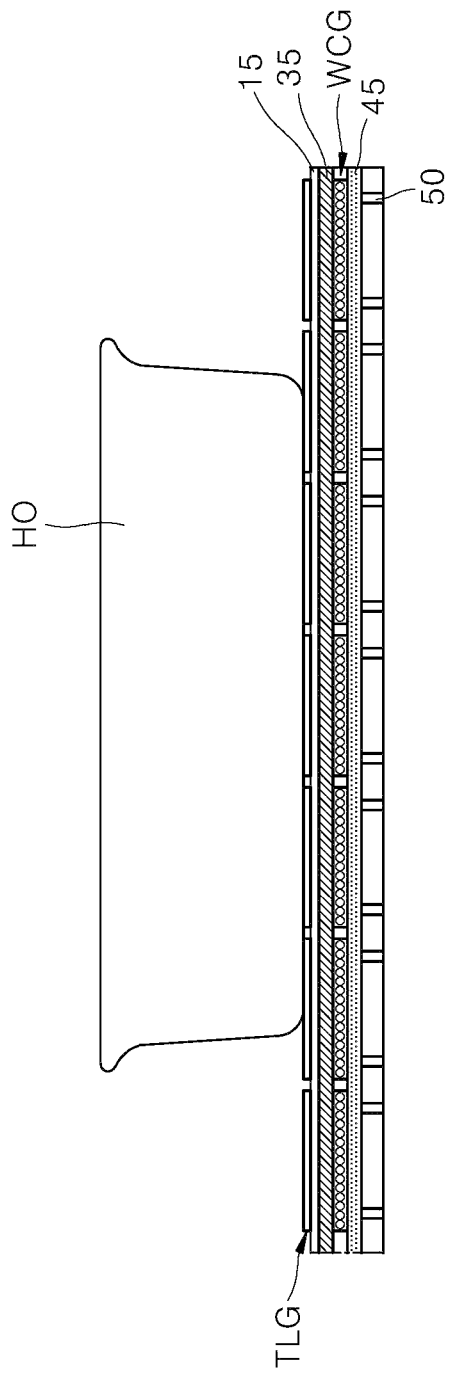
FIG. 8 is a diagram illustrating exemplary elements provided in the induction heating type cooktop of FIG. 7.
Figure 9:
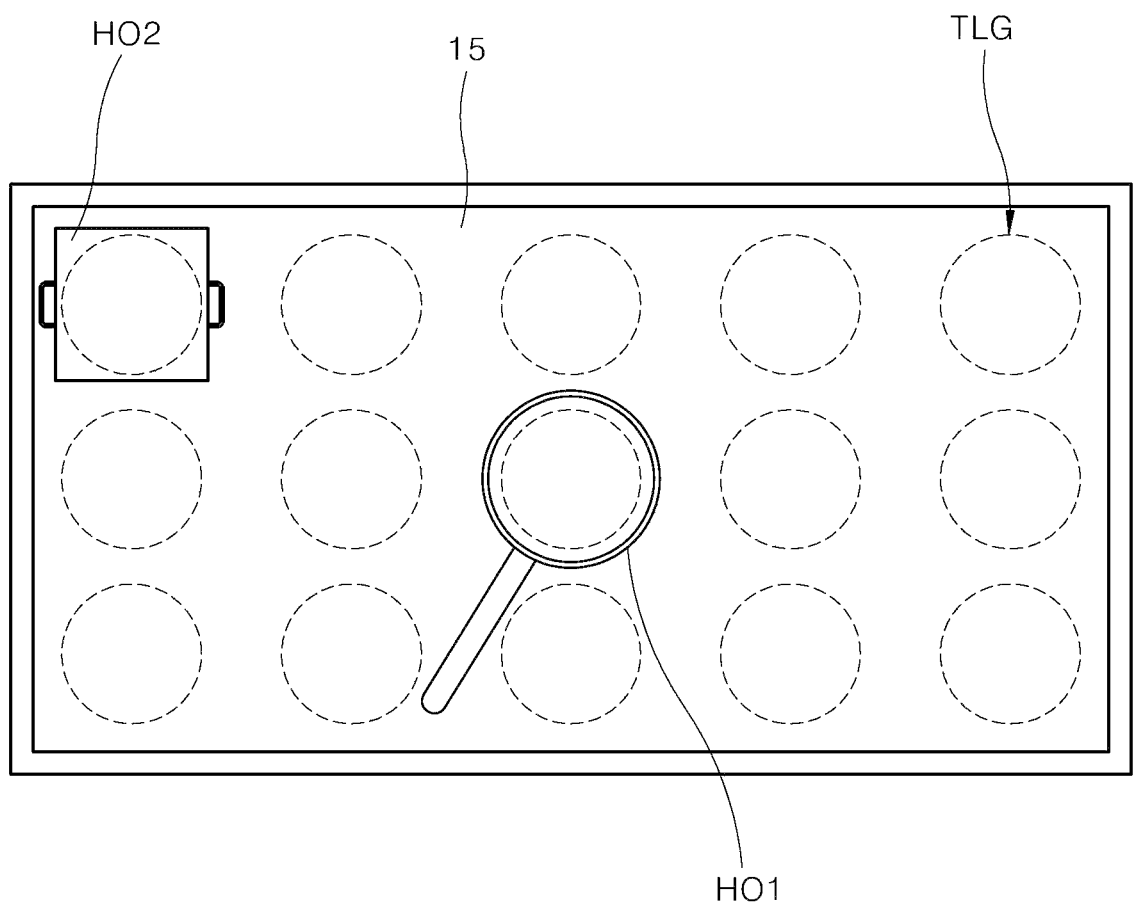
FIG. 9 is a diagram illustrating an exemplary target heating object provided on the induction heating type cooktop of FIG. 7.

FIG. 7 is a diagram illustrating another exemplary induction heating type cooktop 2. FIG. 8 is a diagram illustrating exemplary elements provided inside the induction heating type cooktop 2 of FIG. 7. FIG. 9 is a diagram illustrating an exemplary target heating object provided on the induction heating type cooktop 2 of FIG. 7.

The induction heating type cooktop 2 may be identical to the induction heating type cooktop 1 of FIG. 1, except for some elements and features. Hence, differences from the induction heating type cooktop 1 will be focused and described below.

Referring to FIGS. 7 and 8, the induction heating type cooktop 2 may be a zone-free cooktop. In some implementations, the induction heating type cooktop 2 may include a case 25, a cover plate 20, a plurality of thin films TLGs, an insulator 35, a plurality of working coils WCGs, a shield plate 45, a support member 50, a cooling fan, a spacer, and a control unit.

The plurality of thin films TLGs and the plurality of WCGs may overlap in a traverse direction and may be disposed to correspond to each other in a one-to-one relationship. The plurality of thin films TLGs and the plurality of thin films WCGs may be in a many-to-many relationship rather than the one-to-one relationship. In some implementations, for example, the plurality of thin films TLGs and the plurality of working coils WCGs may be arranged in a one-to-one relationship.

For example, the induction heating type cooktop 2 may be a zone-free cooktop including the plurality of thin films TLGs and the plurality of working coils WCGs, and therefore, the induction heating type cooktop 2 may heat a single target heating object HO by using some or all of the plurality of working coils WCGs at the same time or by using some or all of the plurality of thin films TLGs at the same time. In some implementations, the induction heating type cooktop 2 may heat the target heating object HO by using some or all of the plurality of working coils WCG and also by using some or all of the plurality of thin films TLGs.

Accordingly, as shown in FIG. 9, the induction heating type cooktop 2 may include the plurality of working coils WCG (see FIG. 8) and the plurality of thin films TLG (e.g., a region of the upper plate 15), and the induction heating type cooktop 2 may heat target heating objects HO1 and HO2, regardless of sizes, positions, and types of the target heating objects HO1 and HO2.

As such, in the cooktop 1 or 2 in which the thin film TL disposed on the upper plate 15 is inductively heated, if the thin film TL having a small thickness is heated to about 600° C. or more through the inductive heating, a temperature rising speed may increase rapidly so as in a temperature range that absolutely increases. In this case, when measuring the temperature using a typical temperature sensor (e.g., thermistor) requiring a delay time for measuring an accurate temperature, a significantly large error may occur, which may lead to a damage to a component of the cooktop. Accordingly, a temperature measurement method which is different from a conventional technology may be required to measure the temperature of the inductively heated thin film TL. For example, when the target heating object HO placed on the upper plate 15 is formed of a non-magnetic material, heating may be performed through an inductive heating of the thin film TL instead of the target heating object HO and a heat conduction to the target heating object HO. In this example, it is important to accurately and quickly measure the rapidly increasing temperature of the thin film TL.

Figure 10:
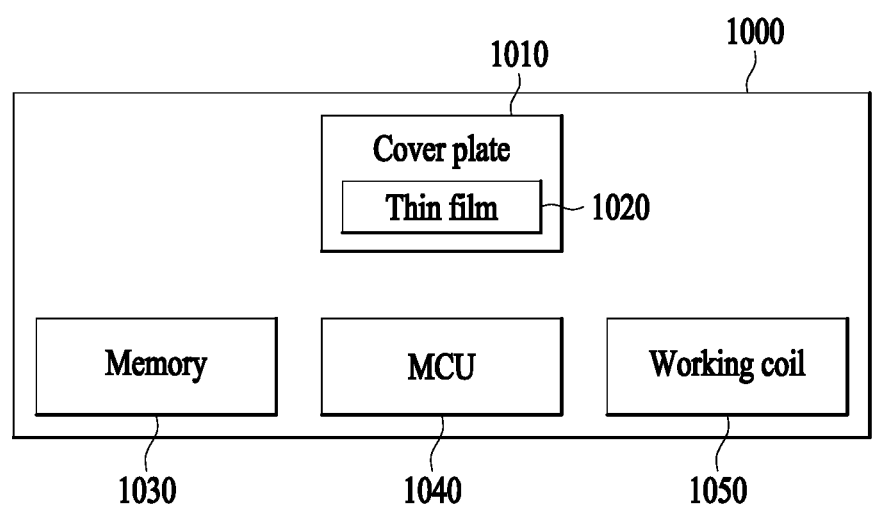
FIG. 10 is an exemplary block diagram illustrating components included in an induction heating type cooktop estimating a temperature of a thin film.

FIG. 10 is a block diagram illustrating exemplary components included in an induction heating type cooktop 1000 that performs an estimation of a temperature of a thin film.

In some implementations, the induction heating type cooktop 1000 described in FIG. 10 and other following drawings may correspond to the induction heating type cooktop 1 used in various implementations described with respect to FIGS. 1 through 9. Hence, components of the induction heating type cooktop 1000 not shown in FIG. 10 may be understood as selectively including components of the cooktop 1 within the scope supported by the description of FIGS. 1 through 9. Further, components described in FIG. 10 corresponding to the components of FIGS. 1 through 9 may have features corresponding to the features described in the foregoing examples with respect to FIGS. 1 through 9.

Referring to FIG. 10, the induction heating type cooktop 1000 may include a cover plate 1010 coupled to a top of a case and having an upper plate 15 on which a target heating object is placed, a thin film 1020 applied to coat at least one of a top face and a bottom face of the upper plate 15, a working coil 1050 provided in the case to inductively heat the thin film 1020, a memory 1030 in which information on one or more correlations between a temperature of the thin film 1020 and inductor and resistor components of an equivalent circuit formed by the thin film 1020 is stored in advance, and a microcontroller unit (MCU) 1040 that operates the working coil 1050 and determines estimated temperature information corresponding to an inductor component and a resistor component of an equivalent circuit formed by the thin film 1020 inductively heated by the working coil, as a current temperature of the thin film 1020 based on the information on the one or more correlations. For example, the MCU 1040 may be a small computer on a single metal-oxide semiconductor (MOS) integrated circuit (IC) chip including one or more CPUs (processor cores) along with memory and programmable input/output peripherals.

The thin film 1020 may be disposed on the upper plate 15. An additional metal layer ML may be disposed at a bottom of the upper plate 15. For example, the additional metal layer ML may be disposed at the bottom of the upper plate 15 and a top of an insulator 35. The thin film 1020 may be disposed on the upper plate 15 included in the cover plate 1010 to contact the target heating object HO.

The thin film 1020 may be disposed at the bottom of the cover plate 1010 instead of the top of the upper plate 15. The thin film 1020 may be in contact with the bottom of the cover plate 1010 or applied to coat the bottom of the cover plate 1010. Also, to reduce a gap caused by the thin film 1020, the thin film 1020 may be formed as a portion of a bottom surface of the cover plate 1010. In this case, the thin film 1020 may be disposed on the bottom surface in various ways instead of a top surface of the upper plate 15 to be prevented from being exposed to outside.

FIG. 10 merely illustrates an example of relationships between components used for an induction heating type cooktop, and embodiments are not limited to the positions, number, and inclusion relations of blocks of FIG. 10.

The memory 1030 may store information on one or more correlations between the temperature of the thin film 1020 and the inductor and resistor components of an equivalent circuit formed by the thin film 1020. The information on the one or more correlations may be stored before the current temperature of the thin film 1020 is determined by the MCU 1040. The information on the one or more correlations may be data obtained by sorting at least one of a resistor component and an inductor component of an equivalent circuit for each temperature of the thin film 1020 based on a thickness of the thin film 1020 and a driving frequency of the working coil 1050.

The resistor component and the inductor component included in the information on the one or more correlations may be a resistor component and an inductor component calculated based on values of an output current and a resonance current. Since a value of capacitance is constant on a circuit of the cooktop 1000 configured in advance, if an output current and a resonance current at an actual heating temperature of the thin film 1020 inductively heated by the working coil 1050 on operation are known, a resistor component and an inductor component of an equivalent circuit may be obtained.

Figure 11A:
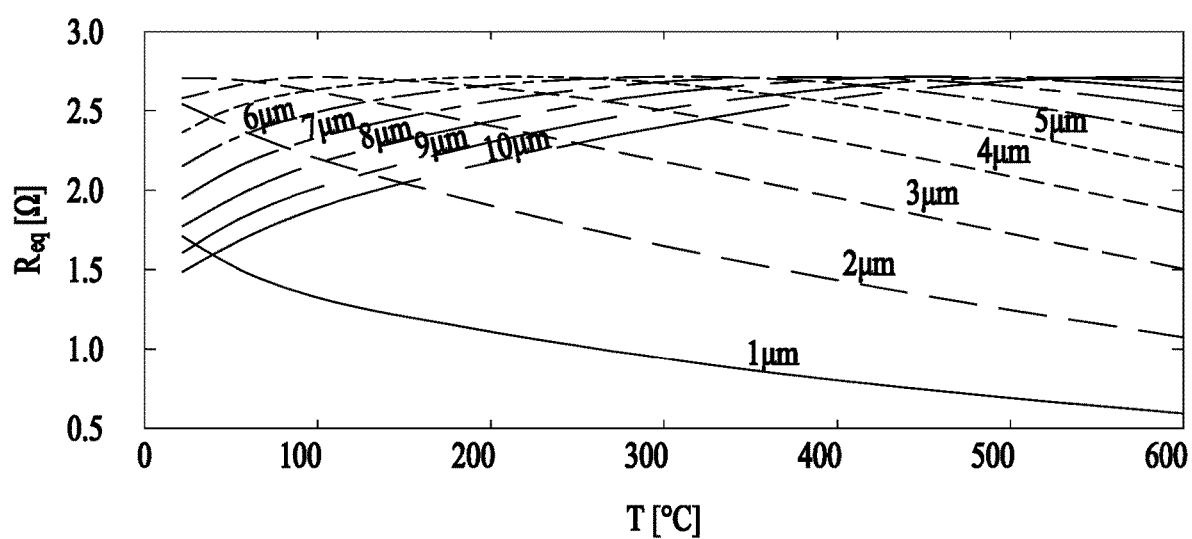
FIG. 11A is a diagram illustrating an exemplary changing aspect of a resistor component of an equivalent circuit of a thin film in accordance with a temperature of the thin film based on a driving frequency of a working coil and a thickness of the thin film.

FIG. 11A is a diagram illustrating an exemplary changing aspect of a resistor component of an equivalent circuit of the thin film 1020 in accordance with a change in temperature of the thin film 1020 based on a thickness of the thin film 1020 and a driving frequency of the working coil 1050.

Referring to FIG. 11A, a change aspect of a resistor component of an equivalent circuit in accordance with an increase in temperature may be determined based on the thickness of the thin film 1020. For example, when the thickness of the thin film 1020 is 1 micrometer (μm), the resistor component may decrease as the temperature of the thin film 1020 increases. By way of further example, when the thickness of the thin film 1020 is 10 μm, the resistor component may increase as the temperature of the thin film 1020 increases. As another example, when the thickness of the thin film 1020 is 6 μm, the resistor component may increase and then decrease as the temperature of the thin film 1020 increases.

The inductor component of the equivalent circuit may increase in size as the temperature of the thin film 1020 increases.

The change aspect of the resistor component may vary based on the driving frequency of the working coil 1050 and a shape or material of the thin film 1020. For example, the resistor component of FIG. 11A may correspond to a case in which the driving frequency of the working coil 1050 is 40 kilohertz (kHz) and the resistor component of the equivalent circuit may vary based on the shape, the material, and the like of the thin film 1020. Accordingly, the resistor component of the equivalent circuit used in various implementations of the present disclosure is not limited to the description of FIG. 11A.

The thin film 1020 of the induction heating type cooktop 1000 may be designed based on a predetermined form factor. The memory 1030 may include information on a correlation corresponding to the form factor (e.g., the thickness of the thin film 1020). For example, information on one or more correlations corresponding to various form factors may be stored in the memory 1030 in advance. The MCU 1040 may acquire information indicating a form factor of the induction heating type cooktop 1000, select information on a correlation corresponding to the form factor, and use the information in a temperature estimating process.

Figure 11B:
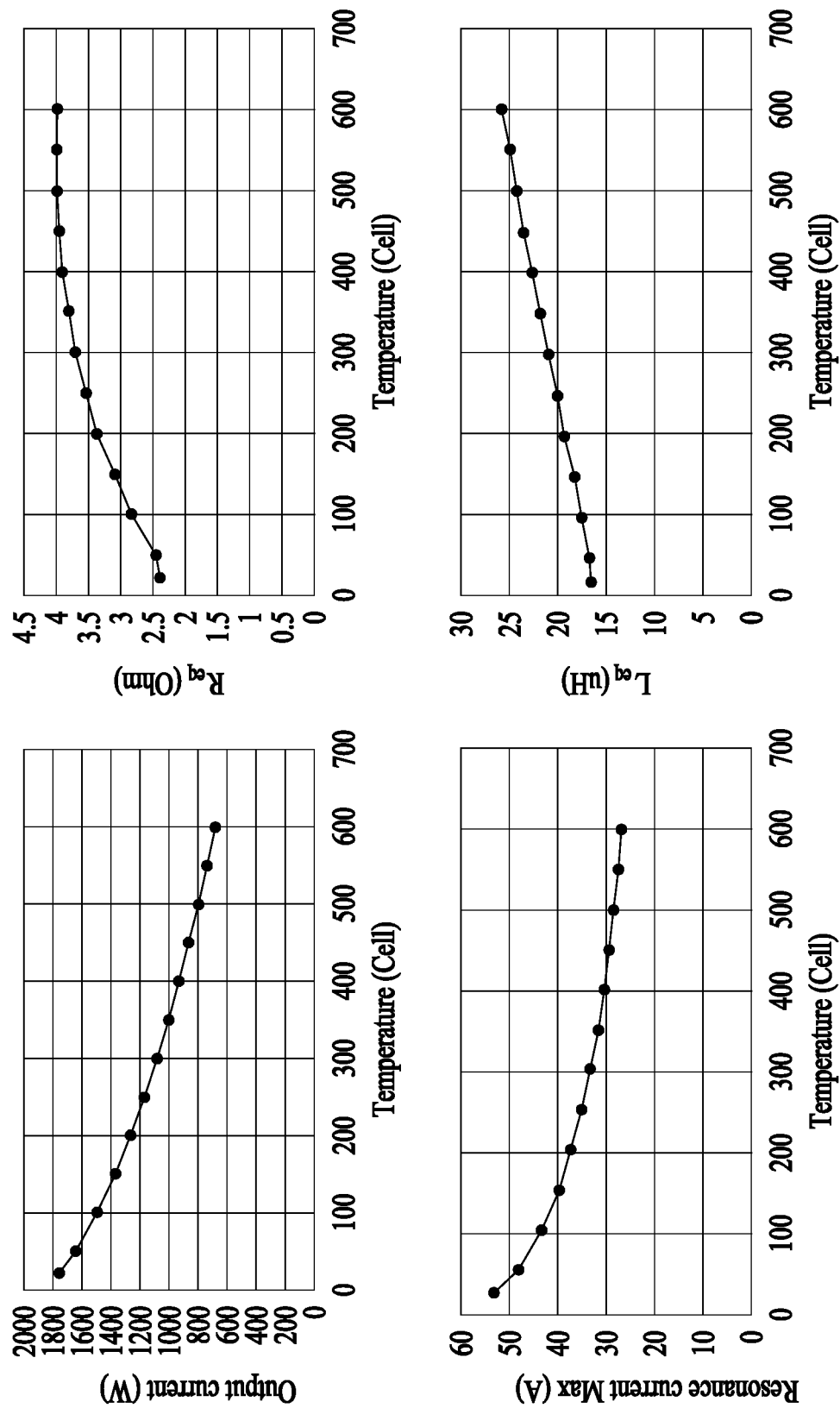
FIG. 11B is a diagram illustrating exemplary changing aspects of a resonance current, an output current, and an inductor component and a resistor component of an equivalent circuit based on a temperature.

FIG. 11B is a diagram illustrating exemplary change aspects of an output current, a resonance current, and an inductor component and a resistor component of the equivalent circuit based on a temperature. Data of FIG. 11B may represent a change aspect in a state in which the form factor and the driving frequency of the working coil 1050 are determined in advance and thus, technical features of various implementations of the present disclosure are not interpreted as being limited thereto. The data of FIG. 11B may be, for example, data acquired when the thickness of the thin film 1020 is 6 μm and the driving frequency of the working coil 1050 is 60 kHz.

FIG. 11B shows a change aspect of the output current based on the temperature of the thin film 1020. As the temperature of the thin film 1020 increases, the output current may decrease. Here, the output current may be determined based on the inductor component and the resistor component of the equivalent circuit formed by the working coil 1050 and the thin film 1020.

FIG. 11B shows an aspect in which a value of the resonance current flowing in the working coil 1050 changes based on the temperature of the thin film 1020. As the temperature of the thin film 1020 increases, the resonance current may decrease. In the exemplary implementation, since a capacitance value of a capacitor in the cooktop 1000 is determined in advance, the inductor component and the resistor component of the equivalent circuit formed by the working coil 1050 and the thin film 1020 at a constant frequency may be known based on measured output current and resonance current values.

For example, an output current P of the equivalent circuit formed by the working coil 1050 and the thin film 1020 may be calculated according to Equation 1 below.

$$P = \frac{2V_{in}^2 \cdot \cos^2\phi}{\pi^2 \cdot R_{eq}} \quad \text{[Equation 1]}$$

In Equation 1, Vin denotes an input power and $R_{eq}$ denotes the resistor component of the equivalent circuit. Since a capacitor on an inverter circuit of the cooktop 1000 has been determined in advance, a cos ∅ value may be determined by an impedance angle ∅ associated with a relationship between the resistor component and a reactance determined based on a relationship between the capacitor and the inductor component of the equivalent circuit.

A resonant frequency $f_{res}$ may be determined to be $$"\frac{1}{2\pi\sqrt{L_{eq}\,C}}"$$

by the inductor component and the capacitor. Accordingly, when a current driving frequency of the working coil 1050 is $f_s$, the output current P of the equivalent formed by the working coil 1050 and the thin film 1020 may be calculated as shown in Equation 2 below.

$$P = \frac{2V_{in}^2}{\pi^2 \cdot R_{eq}\left[1 + Q_L^2 \cdot \left(\frac{f_s}{f_{res}} - \frac{f_{res}}{f_s}\right)^2\right]} \quad \text{[Equation 2]}$$

Through this, the MCU 1040 may calculate the inductor component and the resistor component of the equivalent circuit based on the output current and the resonance current measured for each temperature. The MCU 1040 may measure the output current and resonance current of the cooktop 1000 and determine the inductor component and the resistor component of the equivalent circuit based on the measured currents. Thereafter, the MCU 1040 may compare the determined inductor and resistor components to inductor and inductor components for each temperature stored in the memory 1030, thereby estimating the temperature of the thin film 1020.

Figure 12A:
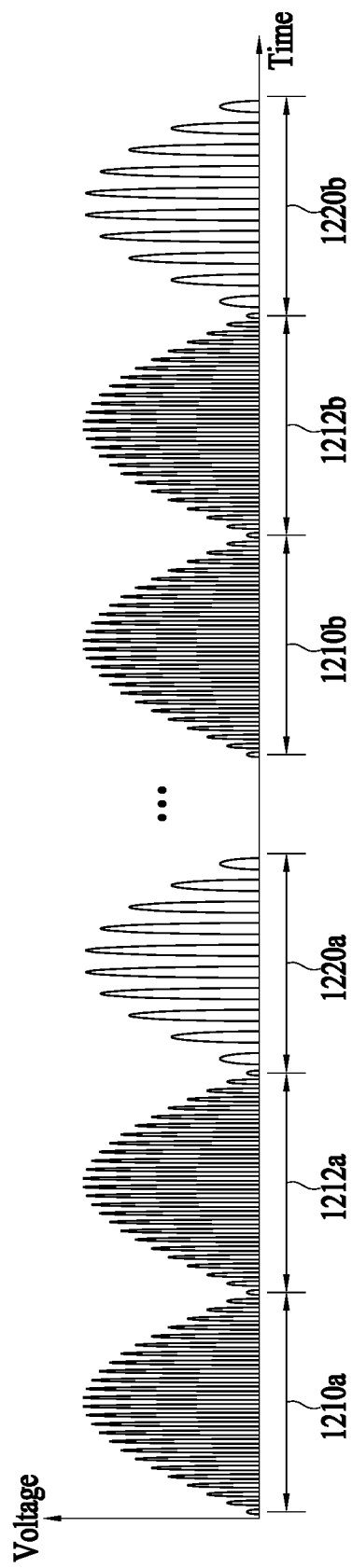
FIG. 12A illustrates an example of a driving frequency corresponding to an output set by a user and an input voltage for driving a working coil based on a fixed frequency used for temperature estimation.

FIG. 12A illustrates an example of an input voltage for operating the working coil 1050 based on a fixed frequency used for temperature estimation and a driving frequency corresponding to an output set by a user.

A user may set an output for heating the target heating object HO using the cooktop 1000. Based on a single input through such setting process, the MCU 1040 may set a driving frequency of the working coil 1050. The driving frequency may vary based on the output set by the user, and may be a variable frequency to be changed based on an operation environment of the cooktop 1000.

Irrespective of the driving frequency corresponding to the output set by the user, the MCU 1040 may estimate the temperature of the thin film 1020 using a fixed frequency set for estimating the temperature of the thin film 1020 and determine the estimated temperature to be the current temperature. A type of the fixed frequency may be one or more.

Hereinafter, the driving frequency corresponding to the output set by the user may be referred to as "first frequency." Also, the fixed frequency set for estimating the temperature of the thin film 1020 may be referred to as "second frequency."

The MCU 1040 may control the working coil 1050 to be driven at the first frequency and control the working coil 1050 operating at the first frequency to be driven at the second frequency. When the working coil 1050 is controlled to operate at the second frequency, a resistor component and an inductor component corresponding to estimated temperature information may be determined based on the second frequency. For example, the MCU 1040 may control the working coil 1050 to be driven at the predetermined second frequency while the working coil 1050 is operating at the output set by the user (that is, at the first frequency). Also, the MCU 1040 may estimate the temperature of the thin film 1020 based on a resistor component and an inductor component calculated during the operation at the corresponding frequency.

A type of the second frequency may be plural. The MCU 1040 may select one of a plurality of second frequencies based on a predetermined condition and use the selected one as a second frequency for estimating the temperature of the thin film 1020.

The MCU 1040 may estimate the temperature of the thin film 1020 through an operation at each of the plurality of second frequencies. In this case, a more accurate result may be obtained in comparison to a temperature estimation result obtained using one of the plurality of second frequencies.

The MCU 1040 may control the working coil 1050 to operate for at least one period at one of the plurality of second frequencies. For example, the MCU 1040 may control the working coil 1050 to operate at a second frequency for at least one period and sequentially operate at another second frequency for at least one period. By way of further example, the MCU 1040 may control the working coil 1050 to operate at a second frequency for at least one period, operate at the first frequency again, and then operate at another second frequency for at least one period.

The MCU 1040 may control the working coil 1050 operating at the first frequency to be driven at the second frequency. Also, an operation of changing a frequency from the first frequency to the second frequency may be periodically performed based on a predetermined period during the operation of the working coil 1050. The predetermined period may be a time of integer multiple (e.g., two times) of a period of an input voltage in a state in which the cooktop 1000 is driven at the first frequency.

Referring to FIG. 12A, after two periods 1210a and 1212a for the input voltage in the state being driven at the first frequency elapse, the MCU 1040 may change a frequency to the second frequency, so that the working coil 1050 is operated at the second frequency for at least one period 1220a. The MCU 1040 may calculate an inductor component and a resistor component of an equivalent circuit based on an output current and a resonance current obtained while the working coil 1050 is driven at the second frequency. The MCU 1040 may estimate the temperature of the thin film 1020 using estimated temperature information corresponding to the resistor component and the inductor component calculated based on the second frequency. The MCU 1040 may determine the estimated temperature as a current temperature of the thin film 1020.

After determining the temperature estimated at the second frequency as the current temperature, the MCU 1040 may change the frequency of the working coil 1050 from the second frequency to the first frequency again. Through this, the MCU 1040 may control the working coil 1050 to operate at the first frequency again according to the output set by the user. After operating the working coil 1050 at the second frequency for at least one period 1220a, the MCU 1040 may control the working coil 1050 to be operated at the first frequency for two periods 1210b and 1212b for the input voltage. Thereafter, the MCU 1040 may change the frequency to the second frequency, so that the working coil 1050 is operated at the second frequency in at least one period 1220b.

Figure 12B:
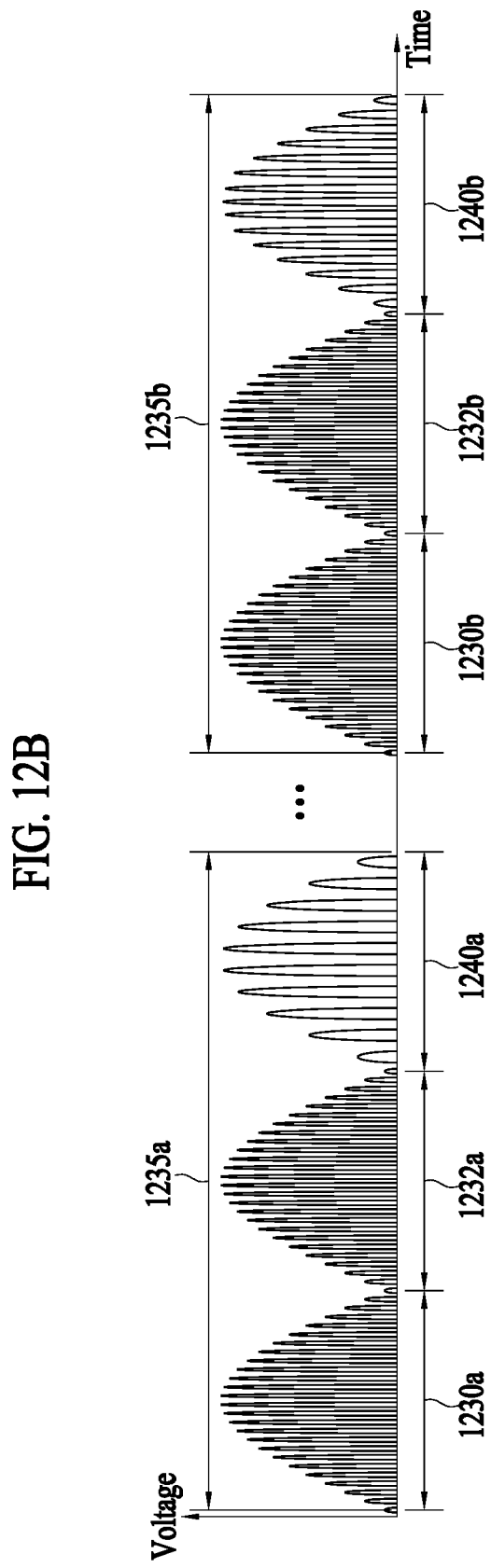
FIG. 12B illustrates an example of an input voltage for operating the working coil based on a plurality of fixed frequencies used for temperature estimation and a driving frequency corresponding to an output set by a user.

FIG. 12B illustrates an example of an input voltage for operating the working coil 1050 based on a plurality of fixed frequencies used for temperature estimation and a driving frequency corresponding to an output set by a user.

The MCU 1040 may estimate a temperature while changing a second frequency to one of a plurality of second frequencies. As such, since the second frequency is a frequency selected from a plurality of fixed frequencies based on a predetermined condition, when a current period satisfies a condition different from that of a previous period, a fixed frequency different from that of the previous period may be set to be the second frequency. When the working coil 1050 has operated at a current second frequency for a predetermined period, the MCU 1040 may control the working coil 1050 to estimate the temperature of the thin film 1020 while operating at another second frequency.

Referring to FIG. 12B, the MCU 1040 may control the working coil 1050 to operate at a first frequency for predetermined periods 1230a and 1232a and then operate at the second frequency for a predetermined period 1240a. When the working coil 1050 operates at the second frequency, the MCU 1040 may estimate a current temperature of the thin film 1020. A predetermined period 1235a of operating at the first frequency and the second frequency may be repeated a predetermined number of times.

When the period 1235a is repeated for the predetermined number of times, the MCU 1040 may change the second frequency of the working coil 1050 to estimate the temperature. Referring to FIG. 12B, the MCU 1040 may estimate the temperature by operating the working coil 1050 at a current second frequency for the predetermined period 1235a and operating the working coil 1050 at a changed second frequency for a predetermined period 1240b. Within the predetermined period 1235b, the MCU 1040 may control the working coil 1050 to operate at the first frequency for predetermined periods 1230b and 1232b and then operate at the second frequency for the predetermined period 1240b.

The predetermined periods 1235a and 1235b in which the working coil 1050 operates at the first frequency and the second frequency may be different or the same. After the predetermined period 1235b including a period in which the working coil 1050 operates at a changed second frequency elapses, the MCU 1040 may operate the working coil 1050 at an unchanged second frequency again for the predetermined period 1235a or change a frequency to another second frequency, thereby estimating the temperature.

An average output obtained during the operation at the first frequency and the second frequency may correspond to an output set by a user. To compensate for a change in instantaneous power caused by a frequency change from the first frequency to the second frequency, the MCU 1040 may adjust an output during the operation at the first frequency and the second frequency. For example, when the second frequency is lower than the first frequency, the instantaneous power during the operation at the second frequency may be less than the instantaneous power during the operation at the first frequency. By way of further example, the MCU 1040 may adjust a value of the first frequency such that average power during the operation at the first frequency and the second frequency corresponds to the output set by the user (for example, the MCU may adjust the first frequency to be higher than a frequency corresponding to the output set by the user).

The first frequency and the second frequency may be merely different in varying based on the output set by the user or being one selected from the plurality of predetermined frequencies and thus, it should not be interpreted as being different in values of the frequencies itself.

For example, the first frequency may be different from the second frequency. By way of further example, the MCU 1040 may set the first frequency such that an output in a period (e.g., 1210a, 1212a, and 1220a) including the period of the operation at the first frequency and the period of the operation at the second frequency corresponds to the output set by the user.

The aforementioned temperature estimating process may be periodically performed while the working coil 1050 is operated at the first frequency based on the output set by the user. Since the second frequency is at least one predetermined frequency not being zero, it is possible to prevent a situation such as an occurrence of humming sound caused when the operation of the working coil 1050 is suspended.

Figure 13A:
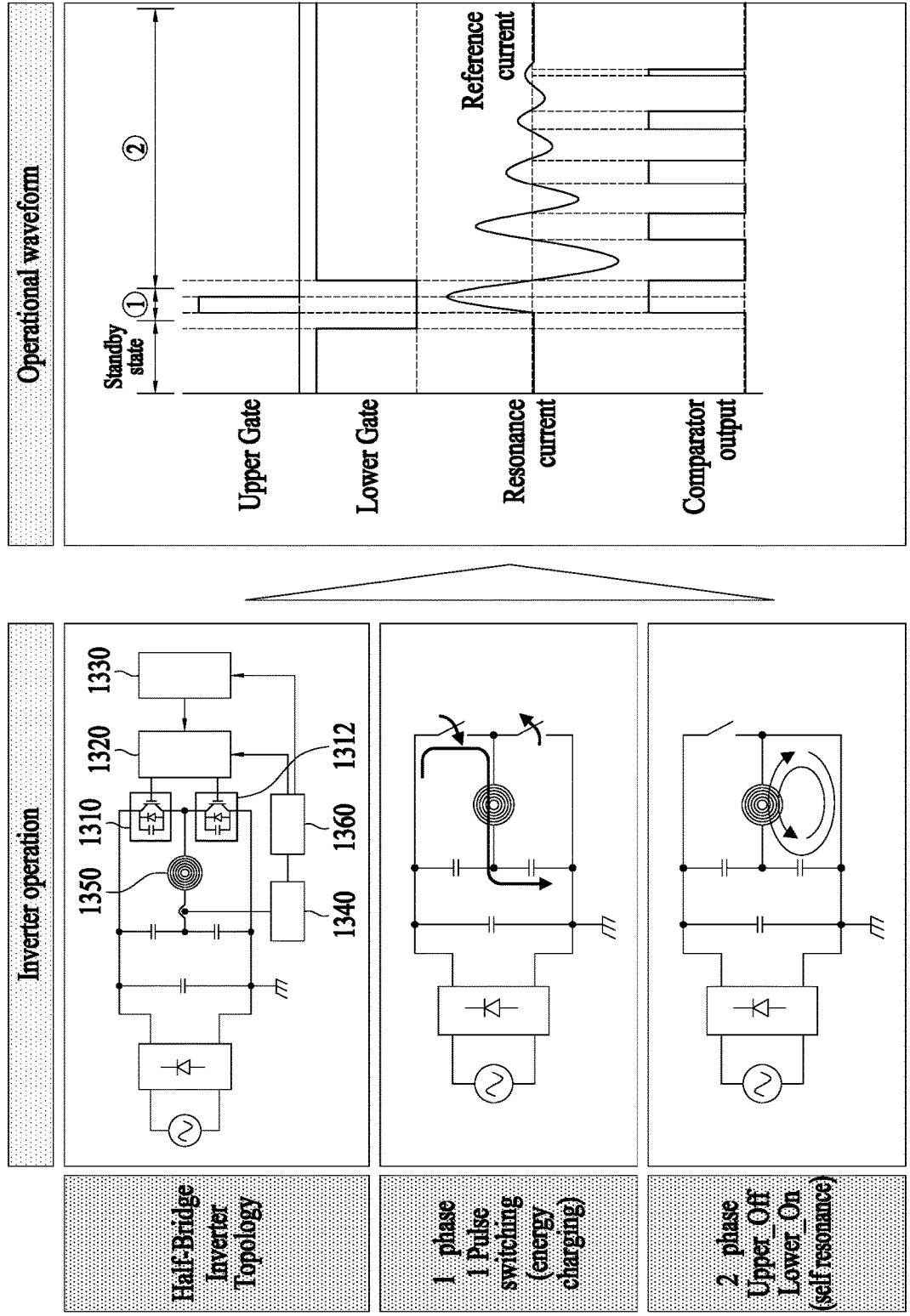
FIG. 13A is a diagram illustrating an exemplary method of performing temperature estimation based on a self resonance scheme.

FIG. 13A is a diagram illustrating an exemplary method of performing temperature estimation based on a self resonance scheme.

The cooktop 1000 may include gate elements 1310 and 1312, a gate driver 1320, an MCU 1330, a comparator 1340, a working coil 1350, and a switching controller 1360.

The gate driver 1320 may perform an on/off operation on the gate elements 1310 and 1312 based on a control signal of the switching controller 1360. The comparator 1340 may measure a resonance current exerted on the working coil 1350. Based on a determination that whether the measured resonance current is greater than a predetermined threshold current, the comparator 1340 may generate a pulse wave and output the generated pulse wave. When the output of the comparator 1340 is received, the switching controller 1360 may calculate a resonance frequency and an attenuation width. In some implementations, the MCU 1330 and the switching controller 1360 may be implemented as a single configuration. In such implementations, the foregoing operation of the switching controller 1360 may also be performed by the MCU 1330.

Referring to FIG. 13A, the cooktop 1000 may provide the resonance current to the working coil 1350 based on a switching operation. The cooktop 1000 may perform a temperature measurement in a driving process using a fixed frequency (e.g., a second frequency) in a situation in which the working coil 1350 is operated at an output corresponding to an output input by a user. In addition, the cooktop 1000 may transition the working coil 1350 to a self resonance state when a predetermined current flows through the working coil 1350 and measure a resonant frequency and an attenuation width of the resonance current, thereby determining an inductor component and a resistor component of an equivalent circuit. The MCU can be configured to control the working coil to enter the self resonance state changed from the standby state which is before the working coil is operated at a frequency corresponding to an output level input by a user.

When a current having a predetermined value is exerted on the working coil 1350 in a state in which a target heating object is not placed on the upper plate 15 (hereinafter, referred to as "standby state"), a state of the cooktop 1000 may be changed from the standby state to the self resonance state through the switching operation of the gate elements 1310 and 1312. Referring to FIG. 13A, in the standby state, an upper gate (e.g., the gate element 1310) may be in an off state and a lower gate (e.g., the gate element 1312) may be in an on state.

In the standby state, the resonance current may have the predetermined current value, and the MCU 1330 may control the gate driver 1320 such that the switching operation of the gate elements 1310 and 1312 is performed. The MCU can be configured to allow a preset current having a constant value in the standby state to flow in working coil. When the switching operation is initiated ($1^{st}$ phase), the lower gate 1312 may enter the off state and the upper gate 1310 may enter the on state. When the upper gate 1310 is on and the lower gate 1312 is off, a resonant capacitor may be charged based on the current flowing through the upper gate 1310.

The MCU 1330 may control the gate driver 1320 such that the switching operation of the gate elements 1310 and 1312 is performed. In this instance, the upper gate 1310 may enter the off state and the lower gate 1312 may enter the on state ($2^{nd}$ phase). Accordingly, a closed circuit including the working coil 1350 and the resonant capacitor charged in the 1st phase may enter the self resonance state. In the self resonance state, the cooktop 1000 may measure the current flowing to the working coil 1350. The cooktop 1000 may calculate the inductor component and the resistor component based on the current measured in the self resonance state and determine the current temperature of the thin film 1020.

Figure 13B:
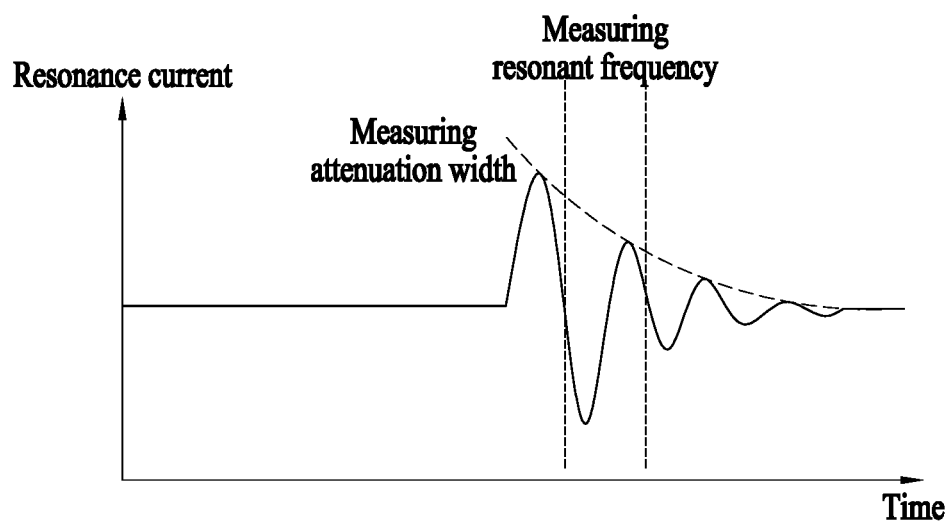
FIG. 13B is a diagram illustrating an example of a characteristic of acquiring a resonant frequency and an attenuation width to acquire a resistor component and an inductor component of an equivalent circuit in a self resonance scheme for temperature estimation.

FIG. 13B is a diagram illustrating a characteristic of acquiring a resonant frequency and an attenuation width to acquire a resistor component and an inductor component of an equivalent circuit in a self resonance scheme for temperature estimation.

Referring to FIG. 13B, the comparator 1340 may determine an attenuation width based on a decrease in a maximum value of a resonance current and determine a resistor component based on the attenuation width. Also, the comparator 1340 may determine a resonant frequency based on an iteration period of the resonance current and determine an inductor component based on the resonant frequency.

An MCU 1330 may determine correlation information corresponding to the resistor component and the inductor component determined based on the attenuation width and the resonant frequency. Through this, the MCU 1330 may determine estimated temperature information determined based on the correlation information, to be a current temperature of the thin film 1020.

Figure 14:
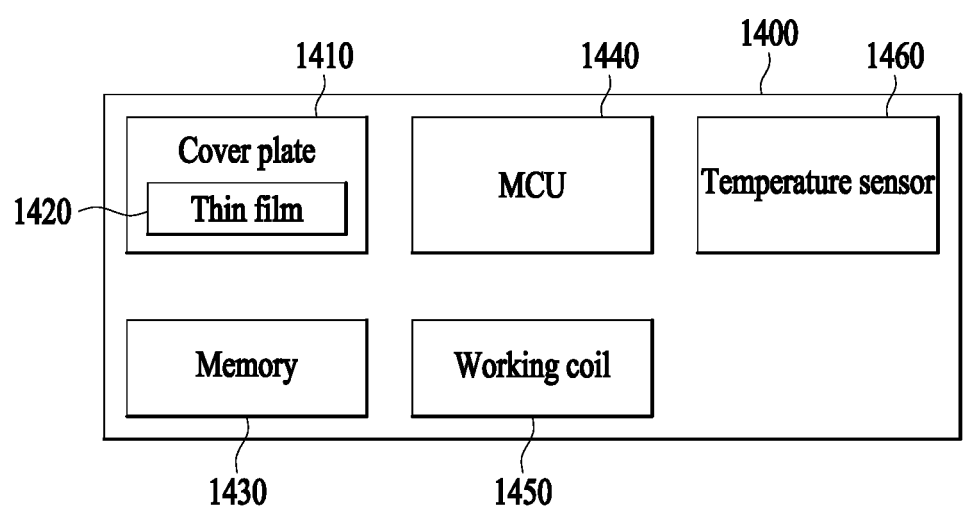
FIG. 14 is a block diagram illustrating an exemplary induction heating type cooktop for recognizing whether a thin film is damaged by comparing a temperature estimated using an equivalent circuit formed by the thin film and a temperature measured through a temperature sensor.

FIG. 14 is a block diagram illustrating an exemplary induction heating type cooktop for recognizing whether a thin film is damaged by comparing a temperature estimated using an equivalent circuit formed by the thin film and a temperature measured through a temperature sensor. An induction heating type cook top 1400 may include a cover plate 1410, a thin film 1420, a memory 1430, an MCU 1440, and a working coil 1450. The cover plate 1410, the thin film 1420, the memory 1430, the MCU 1440, and the working coil 1450 may correspond to the cover plate 1010, the thin film 1020, the memory 1030, the MCU 1040, and the working coil 1050 included in the induction heating type cooktop 1000 of FIG. 10.

The induction heating type cooktop 1400 may further include a temperature sensor 1460. By using the temperature sensor 1460, the induction heating type cooktop 1400 may measure a temperature of the thin film 1420.

The MCU 1440 of the induction heating type cooktop 1400 may determine whether the thin film 1420 is damaged based on information on one or more correlations between the temperature of the thin film 1420 and inductor and resistor components of an equivalent circuit formed by the thin film 1420. Here, the information on the one or more correlations may be previously stored in the memory 1430. The MCU 1440 may operate the working coil 1450 and determine estimated temperature information corresponding to an inductor component and a resistor component of an equivalent circuit formed by the thin film 1420 inductively heated by the working coil 1450 based on the information on the one or more correlations stored in the memory 1430. The MCU 1440 may determine whether the thin film 1420 is damaged by comparing the determined estimated temperature information and measured temperature information indicating an actual temperature of the thin film 1420 measured by the temperature sensor 1460.

The stored information on the one or more correlations between the temperature of the thin film 1420 and the inductor and resistor components of the equivalent circuit formed by the thin film 1420 may include information on an inductor component and a resistor component of an equivalent circuit formed for each temperature to which the undamaged thin film 1420 is heated. Thus, as compared to a result of measuring the actual temperature of the thin film 1420, a temperature estimated based on the information on the one or more correlations stored in the memory 1430 may be substantially the same, or different within a predetermined range. A scheme in which the induction heating type cooktop 1400 estimates the temperature of the thin film 1420 may be implemented through the example embodiments described with respect to FIGS. 10 through 13B.

Figure 15:
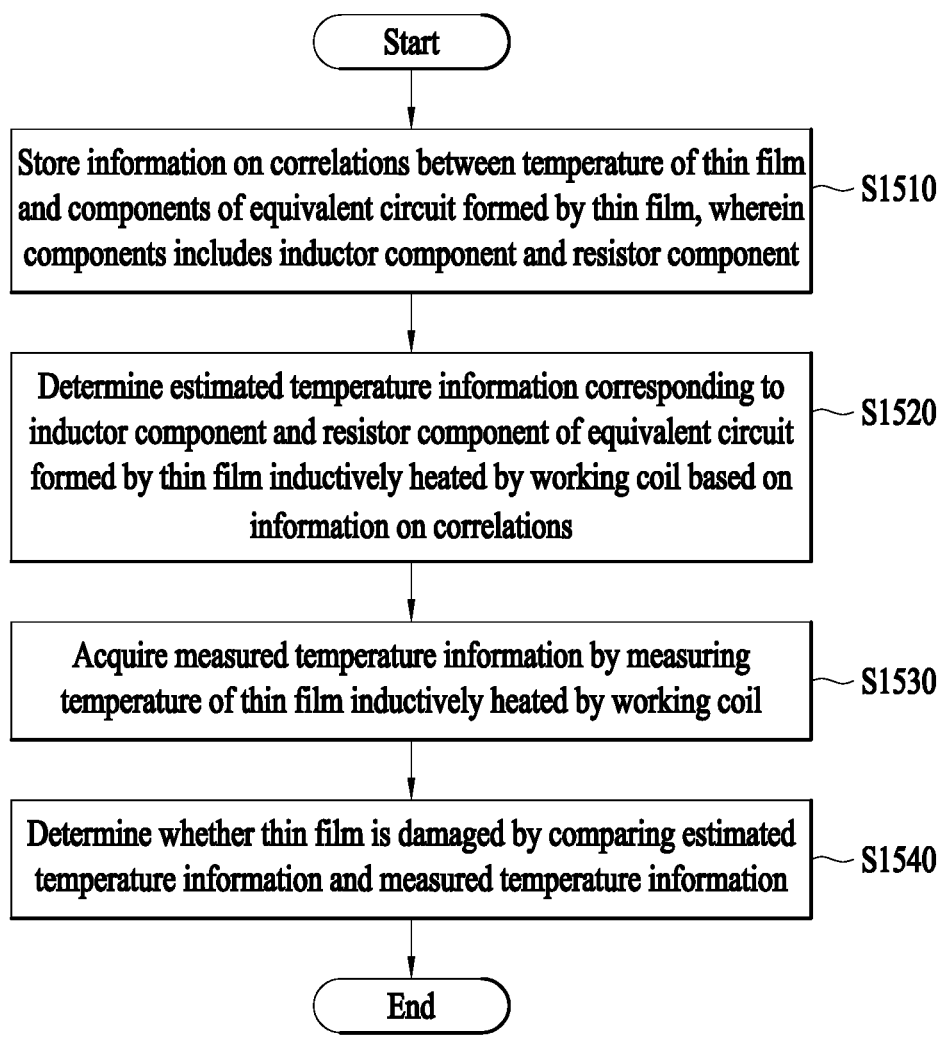
FIG. 15 is a flowchart illustrating an exemplary method of determining, by an induction heating type cooktop, whether a thin film is damaged by comparing estimated temperature information and measured temperature information.

FIG. 15 is a flowchart illustrating an exemplary method of determining, by the induction heating type cooktop 1400, whether a thin film is damaged by comparing estimated temperature information and measured temperature information.

In operation S1510, the cooktop 1400 may store, in the memory 1430, information on one or more correlations between a temperature of the thin film 1420 and inductor and resistor components of an equivalent circuit formed by the thin film 1420. For example, a time at which the memory 1430 stores the information on the one or more correlations may be a predetermined point in time of operation S1540 in which estimated temperature information is compared to measured temperature information. However, for ease and brevity, the following description will be made under the assumption that the storing of the information is performed in operation S1510. The cooktop 1400 may store the information on the correlation in the memory 1430 before the estimated temperature information is compared to the measured temperature information. Also, it may not be necessary to perform data processing for storing information through a predetermined control, communication, and storing process before a process of comparing the estimated temperature information and the measured temperature information. For example, the information on the correlation stored in the memory 1430 of the cooktop 1400 may be information stored in the memory 1430 as factory initial setting data, or information that is received through an external server and stored in the memory 1430 at a point in time before the process of comparing the estimated temperature information and the measured temperature information.

In operation S1520, the cooktop 1400 may determine estimated temperature information corresponding to an inductor component and a resistor component of an equivalent circuit formed by the thin film 1420 inductively heated by the working coil 1450 based on the information on the one or more correlations stored in operation S1510. The thin film 1420 may be inductively heated in response to the working coil 1450 being operated. The inductor component and the resistor component of the equivalent circuit formed by the thin film 1420 may be changed in response to the thin film 1420 being inductively heated. The MCU 1440 may calculate the inductor component and the resistor component of the equivalent circuit using an output current, a resonance current, and the like of the working coil 1450. Also, the MCU 1440 may determine the estimated temperature information corresponding to the resistor component and the inductor component based on the stored information on the one or more correlations. The estimated temperature information determined by the MCU 1440 may not be an actual temperature measured by the temperature sensor 1460 but may be an estimated value.

In operation S1530, the cooktop 1400 may acquire measured temperature information by measuring the temperature of the thin film 1420 inductively heated by the working coil 1450 through the temperature sensor 1460.

In operation S1540, the cooktop 1400 may determine whether the thin film 1420 is damaged by comparing the estimated temperature information determined in operation S1520 and the measured temperature information acquired in operation S1530. If the thin film 1420 is not damaged, the estimated temperature information and the measured temperature information may be the same or slightly different. If the thin film 1420 is damaged, the corresponding estimated temperature information may be drastically changed due to changes in the inductor component and the resistor component of the equivalent circuit formed by the thin film 1420. Thus, the MCU 1440 may determine whether the thin film 1420 is damaged based on a difference between the actual temperature and the estimated temperature caused by the damage to the thin film 1420.

Figure 16:
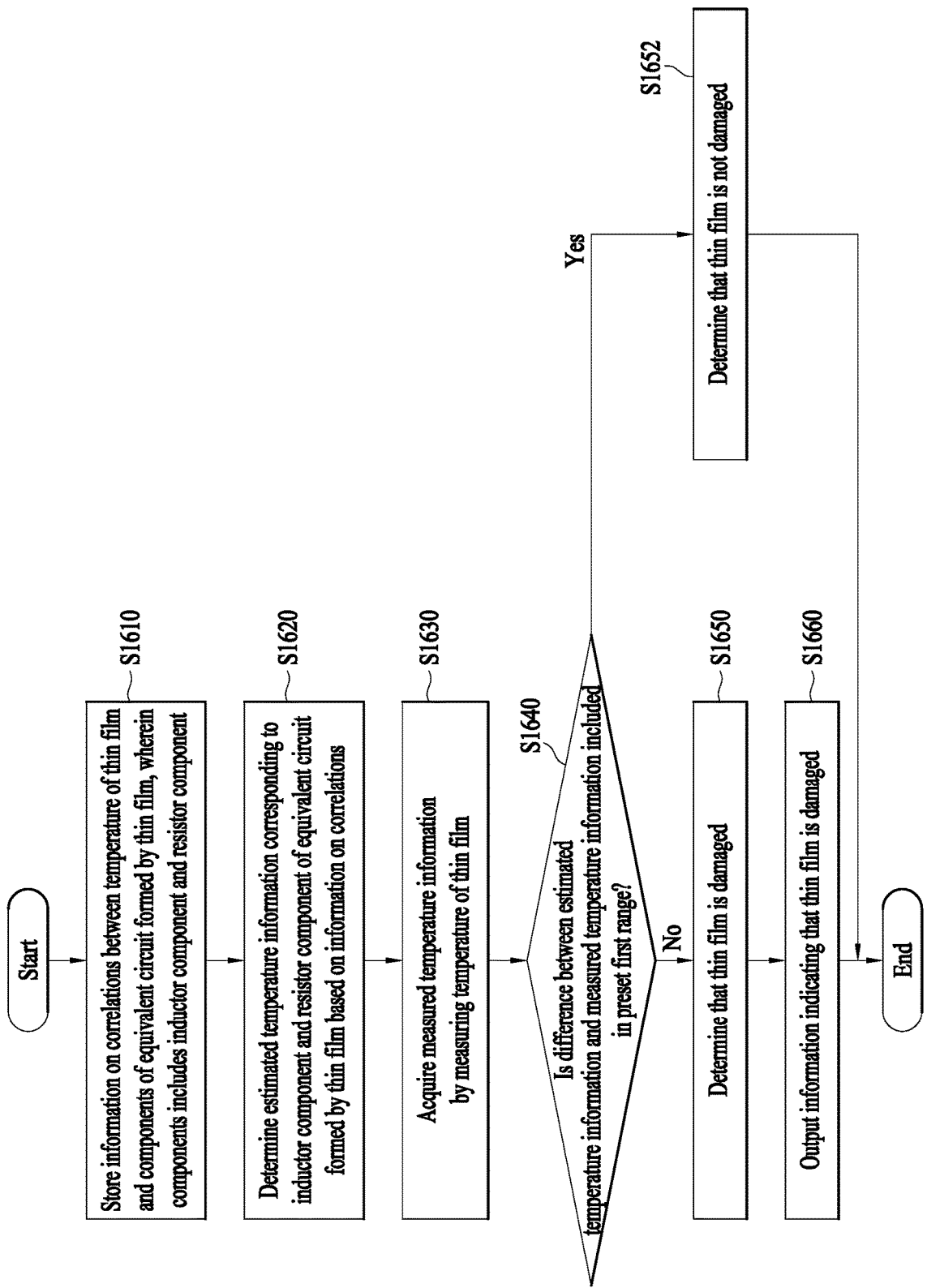
FIG. 16 is a flowchart illustrating an exemplary method of determining, by a cooktop, whether a thin film is damaged based on whether a difference between estimated temperature information and measured temperature information is included in a first range.

FIG. 16 is a flowchart illustrating an exemplary method of determining, by the cooktop 1400, whether the thin film 1420 is damaged based on whether a difference between estimated temperature information and measured temperature information is included in a first range.

Since technical characteristics of operations S1610, S1620, and S1630 of FIG. 16 may be similar or identical to those of operations S1510, S1520, and S1530 of FIG. 15, redundant description will be omitted.

In operation S1640, the cooktop 1400 may compare estimated temperature information determined in operation S1620 and measured temperature information acquired in operation S1630, thereby determining whether a difference between the estimated temperature information and the measured temperature information is included in a preset first range (for example, a range equal to or less than a preset value TH1). The MCU 1440 may calculate a difference between the estimated temperature information and the measured temperature information, and determine whether the calculated difference is too large to be included in the preset first range or sufficiently small to be included in the preset first range, thereby determining whether the thin film 1420 is damaged.

In operation S1650, the MCU 1440 may determine that the thin film 1420 is damaged when the difference between the estimated temperature information and the measured temperature information is not included in the preset first range. For example, when a difference D between the estimated temperature information and the measured temperature information is not included in the preset first range (e.g., if D>TH1), the MCU 1440 may determine that the thin film 1420 is damaged.

The cooktop 1400 may further include an output part that outputs at least one of visual information and auditory information. The MCU 1440 may control the output part to output information. When it is determined in operation S1650 that the thin film 1420 is damaged, the MCU 1440 may output visual information and/or auditory information indicating that the thin film 1420 is damaged through the output part in operation S1660. Through such an output, a user may recognize that the thin film 1420 is damaged.

In operation S1652, the MCU 1440 may determine that the thin film 1420 is not damaged when a difference between the estimated temperature information and the measured temperature information is included within the preset first range. For example, when a difference D between the estimated temperature information and the measured temperature information is included in the preset first range (e.g., if D≤TH1), the MCU 1440 may determine that the thin film 1420 is not damaged.

Figure 17:
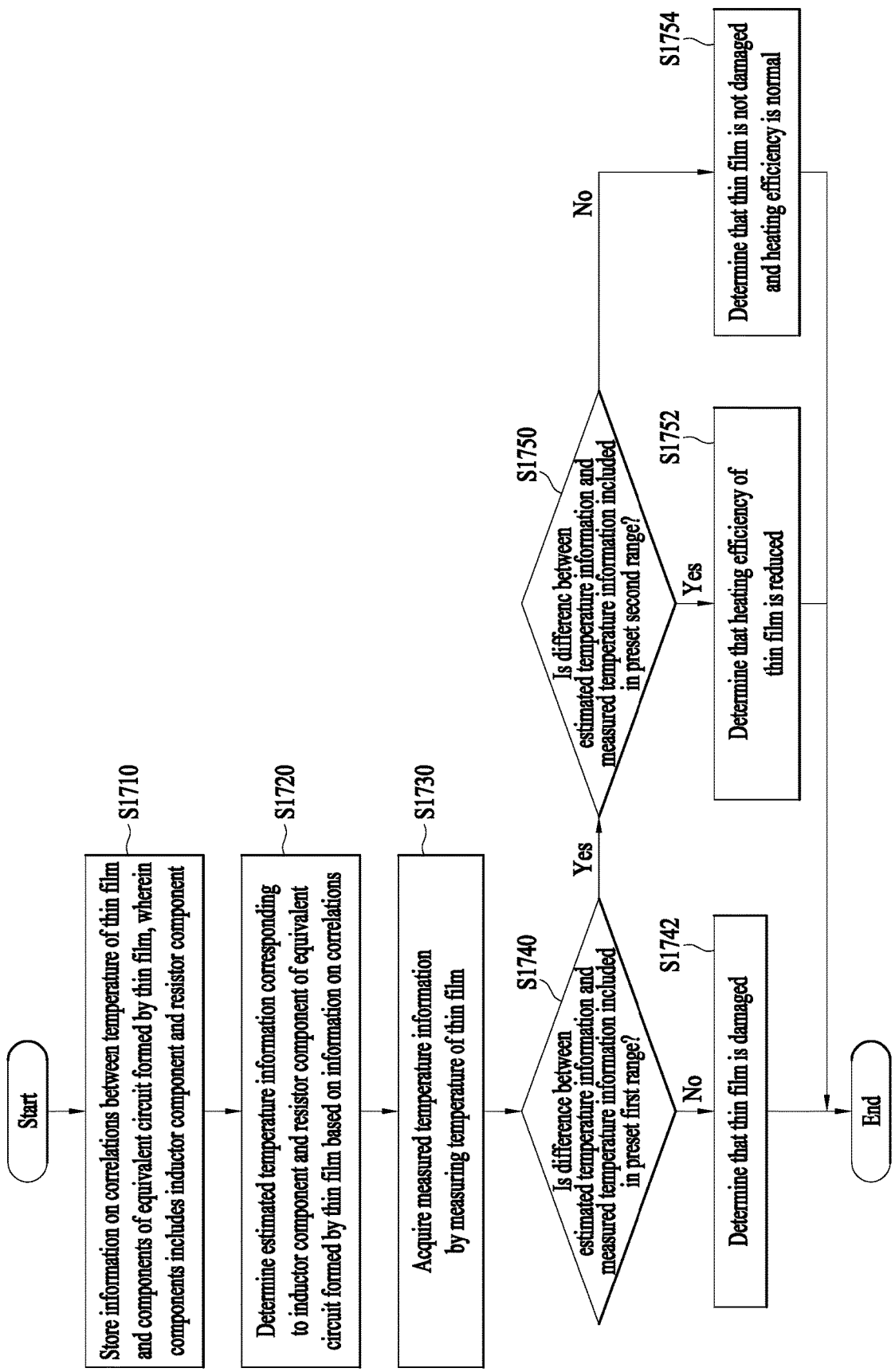
FIG. 17 is a flowchart illustrating an exemplary method of determining, by a cooktop, whether a thin film is damaged, the thin film is not damaged but has a reduced heating efficiency, or the thin film is not damaged and has a normal heating efficiency based on a first range and a second range set in advance.

FIG. 17 is a flowchart illustrating an exemplary method of determining, by the cooktop 1400, whether the thin film 1420 is damaged, the thin film 1420 is not damaged but has a reduced heating efficiency, or the thin film 1420 is not damaged and has a normal heating efficiency based on a first range and a second range set in advance.

Since technical characteristics of operations S1710, S1720, S1730, S1740, and S1742 of FIG. 17 may be similar or identical to those of operations S1610, S1620, S1630, S1640, and S1650 of FIG. 16, redundant description will be omitted.

When it is determined in operation S1740 that a difference between estimated temperature information and measured temperature information is included in a preset first range, the MCU 1440 may determine whether the difference between the estimated temperature information and the measured temperature information is included in a preset second range in operation S1750. The second range may be a preset range corresponding to a portion of a first range. The second range may be set as a biased range (e.g., a range between TH1 and TH2 (TH2≤x≤TH1)) within the preset first range (e.g., a range less than or equal to TH1 (x≤TH1)). The MCU 1440 may determine whether a difference D between the estimated temperature information and the measured temperature information is included within ranges specified based on various criteria (for example, 0≤D<TH2; TH2≤D≤TH1; D>TH1).

When the difference between the estimated temperature information and the measured temperature information is included within the preset second range (for example, TH2≤D≤TH1), in operation S1752, the MCU 1440 may determine that a heating efficiency of the thin film 1420 is reduced. In this case, although the thin film 1420 is not completely damaged to such an extent that it cannot be inductively heated, the MCU 1440 may determine that the heating efficiency is reduced to a predetermined level or less (for example, X % or less of an output obtained in a case of normal induction heating) due to the partial damage to the thin film 1420 as compared to a case in which the thin film 1420 is normally induction heated.

When it is determined that the difference between the estimated temperature information and the measured temperature information is not included in the preset second range (for example, 0≤D<TH2), in operation S1754, the MCU 1440 may determine that the thin film 1420 is not damaged and the heating efficiency is at least a normal level.

The cooktop 1400 may control an output part, thereby outputting a corresponding state when it is determined in operation S1742 that the thin film 1420 is damaged or when it is determined in operation S1752 that the heating efficiency of the thin film 1420 is reduced. Through this, the user may recognize whether the thin film 1420 is damaged or the heating efficiency is reduced.

When it is determined that the thin film 1420 is damaged, the MCU 1440 may control the working coil 1450 not to operate for heating a target heating object HO formed of a nonmetal material. In this case, considering that the cooktop 1400 may malfunction when the damaged thin film 1420 heats the target heating object HO including the nonmetal material, the MCU 1440 may control the working coil 1450 not to be operated, thereby securing a safety. Also, by controlling the working coil 1450 not to be operated, the user may be prevented from misunderstanding as if the target heating object HO including the nonmetal material is heated due to the damage to the thin film 1420 even though the target heating object HO is not substantially heated. Through this, a reliability of a use of the cooktop may be ensured.

The cooktop 1400 may determine whether the target heating object HO placed on the upper plate 15 is formed of the metal material or the nonmetal material. When the target heating object is formed of the nonmetal material and the thin film 1420 is damaged, the MCU 1440 may control the working coil 1450 not to operate for heating the target heating object HO of the nonmetal material. When the target heating object HO is formed of the metal material, the MCU 1440 may control the working coil 1450 to operate based on an output set by the user even if the thin film 1420 is damaged. For example, when a container (e.g., target heating object HO) formed of the metal material is placed on the upper plate 15, the container including the metal material may be directly inducted heated. By way of further example, even if the thin film 1420 is damaged, the MCU 1440 may control the working coil 1450 to operate, thereby securing a convenience of use.

Whether the target heating object HO is formed of the metal material or the nonmetal material may be determined based on the inductor component and the resistor component of the equivalent circuit formed by the thin film 1420 and the target heating object HO. Related description will be made in detail below.

Figure 18:
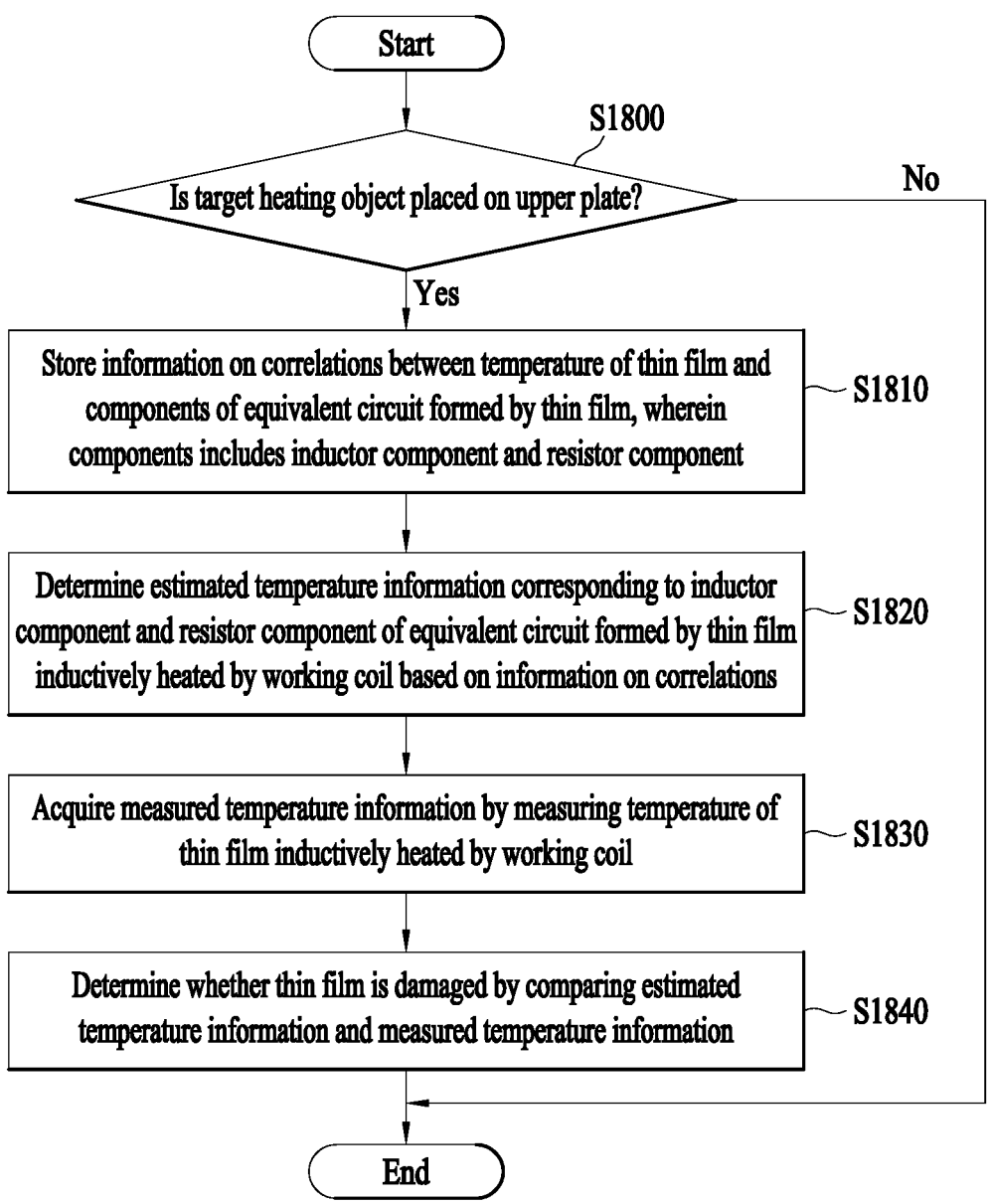
FIG. 18 is a flowchart illustrating an exemplary method of determining whether a thin film is damaged based on whether a target heating object is placed on an upper plate.

FIG. 18 is a flowchart illustrating an exemplary method of determining whether the thin film 1420 is damaged based on whether the target heating object HO is placed on the upper plate 15.

Since technical characteristics of operations S1810, S1820, S1830, and S1840 of FIG. 18 may correspond to the technical characteristics of operations S1410, S1420, S1430, and S1440 of FIG. 14, redundant description will be omitted.

The cooktop 1400 may determine whether the thin film 1420 is damaged only in a case in which the target heating object HO is placed on the upper plate 15. For example, correlation information stored in the memory 1430 of the cooktop 1400 may be information on one or more correlations between a temperature and inductor and resistor components of an equivalent circuit formed by the thin film 1420 when the target heating object HO is not placed. The cooktop 1400 may compare the inductor component and the resistor component of the equivalent circuit formed only by the thin film 1420 to the stored correlation information, thereby estimating the temperature.

The cooktop 1400 may further include a cognitive sensor (e.g., an infrared sensor) to verify whether the target heating object HO is placed on the upper plate 15.

Operation S1800 may be performed based on various ambient circumstances. For example, at a point in time when a user inputs an output, when the target heating object HO placed on the upper plate 15 is removed from the upper plate 15, and when a command to determine whether a thin film is damaged is input by the user, operation S1800 may be performed.

When it is determined in operation S1800 that the target heating object HO is placed on the upper plate 15, the MCU 1440 may perform operation S1810.

When it is determined in operation S1800 that the target heating object HO is not placed on the upper plate 15, the MCU 1440 may not perform a process of verifying whether a thin film is damaged.

The MCU 1440 may determine whether the thin film 1420 is damaged by comparing estimated temperature information measured based on a fixed frequency and measured temperature information. The MCU 1440 may control the working coil 1450 to be operated at a first frequency. Also, the MCU 1440 may control the working coil 1450 operating at the first frequency to be operated at a second frequency. When the working coil 1450 is controlled to operate at the second frequency, a resistor component and an inductor component corresponding to the estimated temperature information may be determined based on the second frequency. The MCU 1440 may control the working coil 1450 operating at an output set by a user (e.g., at the first frequency) to be operated at the second frequency, and estimate a temperature of the thin film 1420 based on a resistor component and an inductor component calculated during the operation at the corresponding frequency. The MCU 1440 may determine whether the thin film 1420 is damaged based on a result of a comparison between the temperature of the thin film 1420 estimated through such fixed frequency-based scheme and the measured temperature information acquired by the temperature sensor 1460. Since the technical feature related to the scheme in which the cooktop 1400 estimates the temperature of the thin film 1420 based on the fixed frequency has been described in various implementations including those described with respect to FIGS. 12A and 12B, redundant description will be omitted.

The MCU 1440 may determine whether the thin film 1420 is damaged based on a temperature estimated using a self resonance scheme. The cooktop 1400 may provide a resonance current to the working coil 1450 based on a switching operation. The cooktop 1400 may perform a temperature measurement in a driving process using a fixed frequency (e.g., the second frequency) in a situation in which the working coil 1450 is driven at an output corresponding to an output input by a user. In addition, the cooktop 1400 may transition the working coil 1450 to a self resonance state when a predetermined current flows through the working coil 1450 and measure a resonant frequency and an attenuation width of the resonance current, thereby determining an inductor component and a resistor component of an equivalent circuit. The MCU 1440 may determine estimated temperature information based on the measured resistor component and inductor component, and compare the estimated temperature information to the measured temperature information acquired by the temperature sensor 1460, thereby determining whether the thin film 1420 is damaged. Since the technical feature related to the scheme in which the cooktop 1400 estimates the temperature of the thin film 1420 based on the self resonance scheme has been described in various implementations including those described with respect to FIGS. 13A and 13B, redundant description will be omitted.

The induction heating type cooktop 1400 may determine a material of a container corresponding to the target heating object HO by comparing a temperature estimated using an equivalent circuit formed by a thin film and a temperature measured by a temperature sensor.

The MCU 1440 of the induction heating type cooktop 1400 may determine a material of the target heating object HO placed on the thin film 1420 using information on one or more correlations between the temperature of the thin film 1420 and inductor and resistor components of an equivalent circuit formed by the thin film 1420. The information on the correlation may be previously stored in the memory 1430. The MCU 1440 may operate the working coil 1450 and determine estimated temperature information corresponding to an inductor component and a resistor component of an equivalent circuit formed by the thin film 1420 inductively heated by the working coil 1450 based on the information on the one or more correlations stored in the memory 1430. The MCU 1440 may compare the determined estimated temperature information and measured temperature information indicating an actual temperature of the thin film 1420 measured by the temperature sensor 1460, thereby determining whether the material of the target heating object HO is a metal material or a nonmetal material.

The stored information on the one or more correlations between the temperature of the thin film 1420 and the inductor and resistor components of the equivalent circuit formed by the thin film 1420 may include information on an inductor component and a resistor component of an equivalent circuit formed for each temperature to which the thin film 1420 is heated. As compared to a result of measuring the actual temperature of the thin film 1420, an estimated temperature estimated based on the information on the one or more correlations stored in the memory 1430 may be substantially the same, or different within a predetermined range. A scheme in which the induction heating type cooktop 1400 estimates the temperature of the thin film 1420 may be implemented through the exemplary implementations described with respect to FIGS. 10 through 13B.

Figure 19:
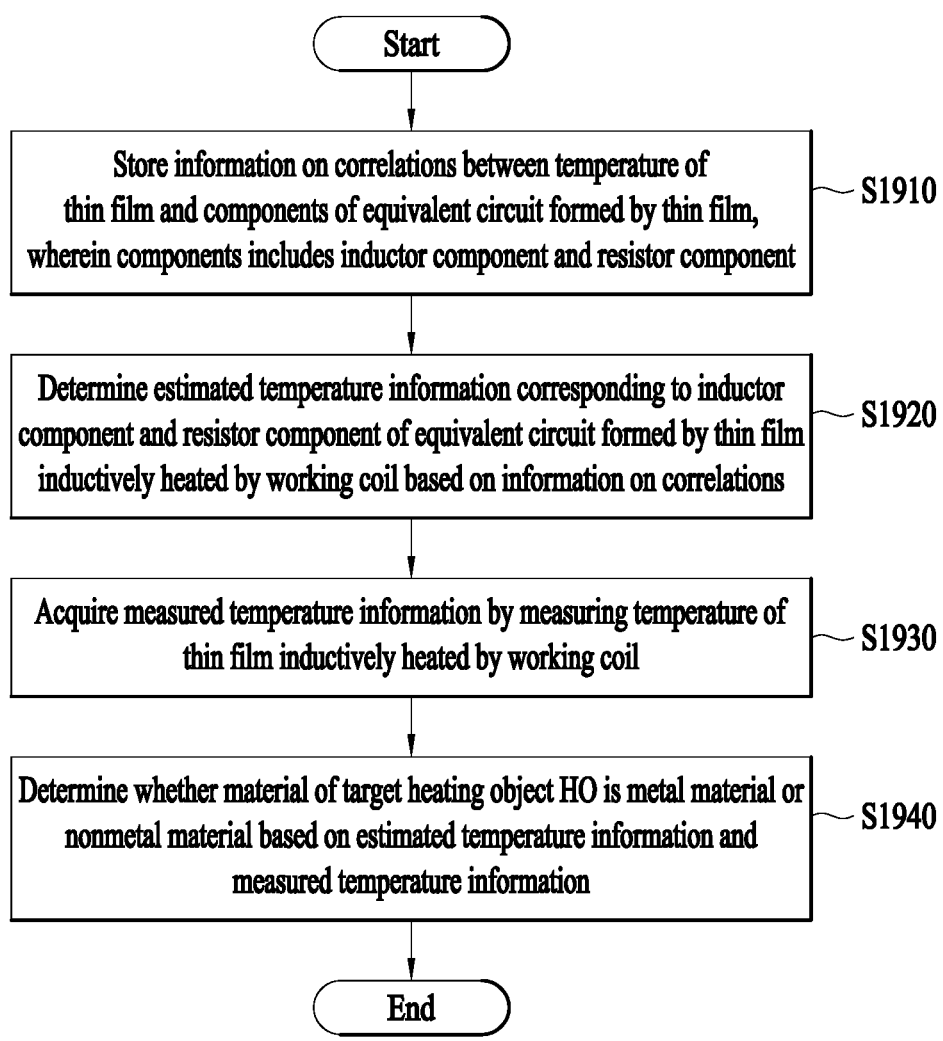
FIG. 19 is a flowchart illustrating an exemplary method of determining, by an induction heating type cooktop, a material of a target heating object HO by comparing estimated temperature information and measured temperature information.

FIG. 19 is a flowchart illustrating an exemplary method of determining, by the induction heating type cooktop 1400, a material of the target heating object HO by comparing estimated temperature information and measured temperature information.

In operation S1910, the cooktop 1400 may store, in the memory 1430, information on one or more correlations between a temperature of the thin film 1420 and inductor and resistor components of an equivalent circuit formed by the thin film 1420. For example, a time at which the memory 1430 stores the information on the one or more correlations may be a predetermined point in time of operation S1940 in which estimated temperature information is compared to measured temperature information. However, for ease and brevity, the following description will be made under the assumption that the storing of the information is performed in operation S1910.

The information on the one or more correlations stored in operation S1910 may be information indicating one or more correlations between an actual temperature of the thin film 1420 and the resistor and inductor components formed by the thin film 1420.

For example, the thin film 1420 may be formed of a material to be inductively heated by the working coil 1450. By way of further example, an equivalent circuit viewed from the working coil 1450 may be a circuit formed by the thin film 1420. When a container placed on the upper plate 15 is formed of the metal material, the container may be inductively heated along with the thin film 1420. Also, when the container including the metal material is placed on the upper plate 15, an equivalent circuit viewed from the working coil 1450 may be a circuit formed by the thin film 1420 and the container.

In operation S1920, the cooktop 1400 may determine estimated temperature information corresponding to an inductor component and a resistor component of an equivalent circuit formed by the thin film 1420 inductively heated by the working coil 1450 based on the information on the one or more correlations stored in operation S1910. In response to the working coil 1450 being operated, the thin film 1420 may be inductively heated. In response to the thin film 1420 being inductively heated, the inductor component and the resistor component of the equivalent circuit formed by the thin film 1420 may be changed. The MCU 1440 may calculate the inductor component and the resistor component of the equivalent circuit based on an output current and a resonance current of the working coil 1450, and determine estimated temperature information corresponding to the resistor component and the inductor component based on the stored information on the one or more correlations. The estimated temperature information determined by the MCU 1440 may not be an actual temperature measured by the temperature sensor 1460 but may be an estimated value.

In operation S1930, the cooktop 1400 may acquire measured temperature information by measuring a temperature of the thin film 1420 inductively heated by the working coil 1450 using the temperature sensor 1460.

In operation S1940, the cooktop 1400 may determine whether a material of the target heating object HO is a metal material or a nonmetal material by comparing the estimated temperature information determined in operation S1920 and the measured temperature information determined in operation S1930.

When the material of the target heating object HO is the nonmetal material, an equivalent circuit viewed from the working coil 1450 is formed only by the thin film 1420. Thus, in this case, the estimated temperature information acquired in operation S1920 and the measured temperature information acquired in operation S1930 may be the same or slightly different.

When the material of the target heating object HO is the metal material, an equivalent circuit viewed from the working coil 1450 is formed by the thin film 1420 and the target heating object HO including the metal material. In this case, due to changes in the inductor component and the resistor component of the equivalent circuit, the corresponding estimated temperature information may be radically changed. Thus, the MCU 1440 may determine whether the thin film 1420 is damaged based on a difference between an estimated temperature and an actual temperature caused due to a damage to the thin film 1420.

Figure 20:
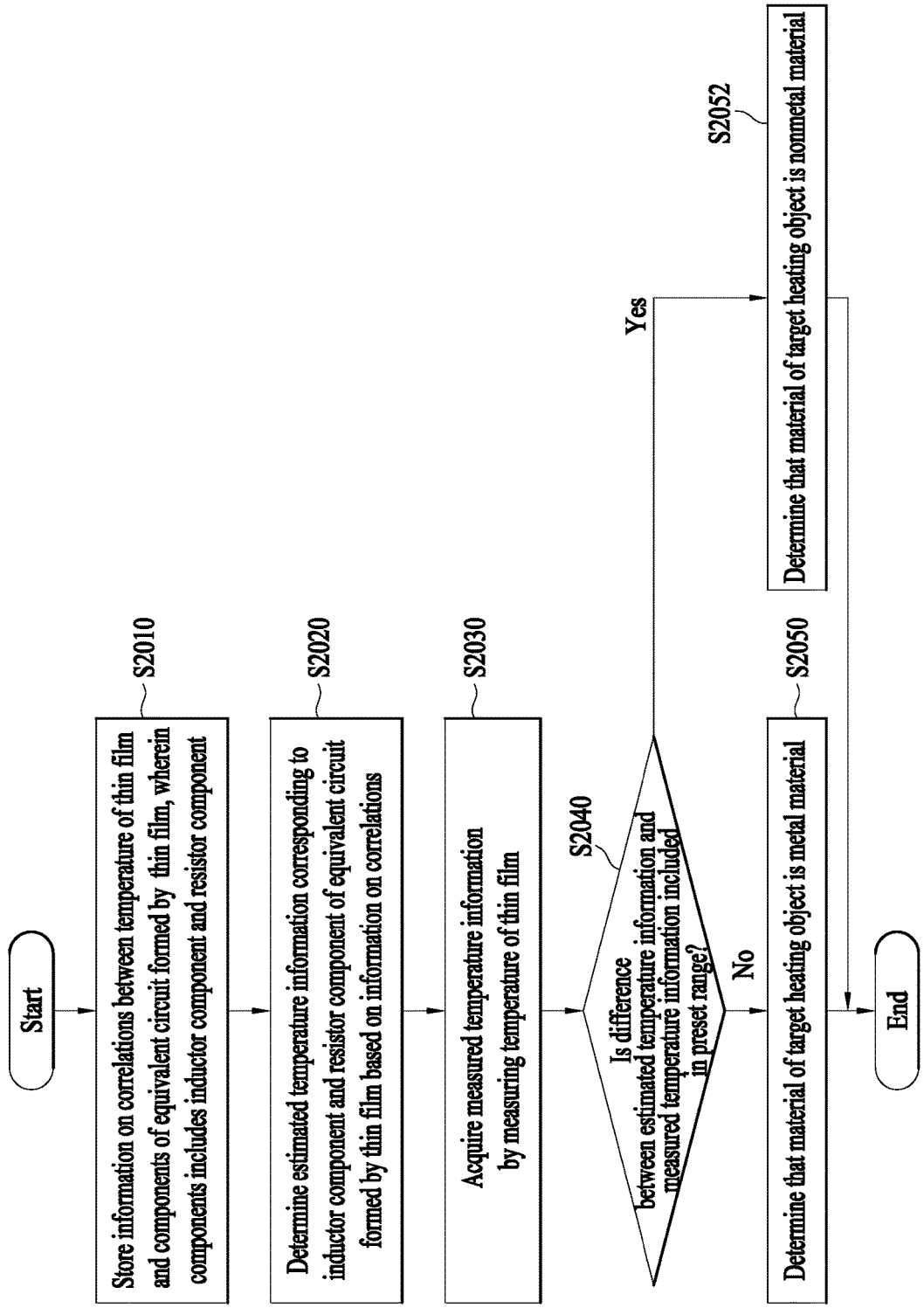
FIG. 20 is a flowchart illustrating an exemplary process of determining, by a cooktop, whether a material of a target heating object HO is a metal material or a non-metal material based on whether a difference between estimated temperature information and measured temperature information is included in a preset range.

FIG. 20 is a flowchart illustrating an exemplary process of determining, by the cooktop 1400, whether a material of the target heating object HO is a metal material or a non-metal material based on whether a difference between estimated temperature information and measured temperature information is included in a preset range. Since technical characteristics of operations S2010, S2020, and S2030 of FIG. 20 may be similar or identical to the technical characteristics of operations S1910, S1920, and S1930 of FIG. 19, redundant description will be omitted.

In operation S2040, the MCU 1440 may determine whether a difference between estimated temperature information and measured temperature information is within a preset range.

When the difference between the estimated temperature information and the measured temperature information is not within the preset range, in operation S2050, the MCU 1440 may determine that a material of the target heating object HO is a metal material. For example, when a difference D between estimated temperature information and measured temperature information is not within the preset range (e.g., if D>TH3), the MCU 1440 may determine that a material of the target heating object HO is a metal material.

When the difference between the estimated temperature information and the measured temperature information is within the preset range, in operation S2052, the MCU 1440 may determine that a material of the target heating object HO is a nonmetal material. For example, when a difference D between estimated temperature information and measured temperature information is within the preset range (e.g., if D≤TH3), the MCU 1440 may determine that a material of the target heating object HO is a nonmetal material.

The cooktop 1400 may further include an output part that outputs at least one of visual information and auditory information. The MCU 1440 may control the output part to output information. When whether a material of the target heating object HO is the metal material or the nonmetal material is determined based on whether a difference between the estimated temperature information and the measured temperature information is within the preset range, visual information and/or auditory information about the material of the target heating object HO may be output through the output part. Through such output, a user may recognize the material of the target heating object HO and verify whether the material of the target heating object HO is correctly detected by the cooktop 1400.

Figure 21:
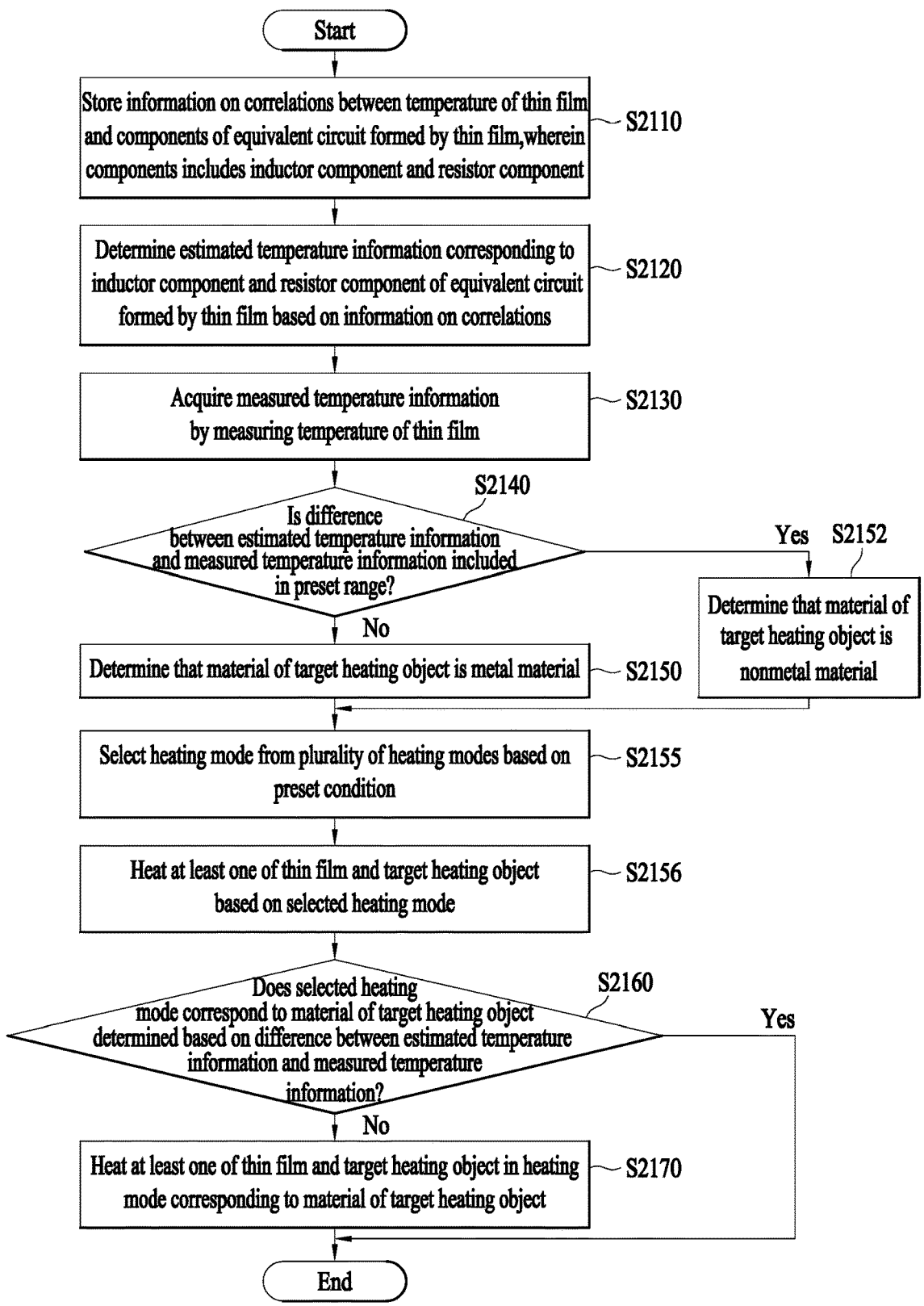
FIG. 21 is a flowchart illustrating an exemplary method of performing a process of determining a material of a target heating object HO in a situation in which at least one of a thin film and the target heating object HO is heated in a heating mode selected based on a preset condition.

FIG. 21 is a flowchart illustrating an exemplary method of performing a process of determining a material of the target heating object HO in a situation in which at least one of the thin film 1420 and the target heating object HO is heated in a heating mode selected based on a preset condition. Since technical characteristics of operations S2110, S2120, S2130, S2140, S2150, and S2152 of FIG. 21 may be similar or identical to the technical characteristics of operations S2010, S2020, S2030, S2040, S2050, and S2052 of FIG. 20, redundant description will be omitted.

In operation S2156, the MCU 1440 may select a heating mode from a plurality of heating modes based on a preset condition. A process of selecting a heating mode based on a preset condition may be implemented in various ways. As an example, the MCU 1440 may select a metal heating mode or a nonmetal heating mode from a plurality of heating modes based on a material of the target heating object HO determined in operation S2150 or S2152. In another example, the MCU 1440 may select the metal heating mode or the nonmetal heating mode based on an external input received through a user interface. In operation S2156, the cooktop 1400 may heat at least one of the thin film 1420 and the target heating object HO based on the selected heating mode.

When operating in the metal heating mode, the cooktop 1400 may perform the heating at a higher output as compared to a case of operating in the nonmetal heating mode. For example, a maximum output of the working coil 1450 in the metal heating mode may be set to 3 kilowatts (kW) and a maximum output of the working coil 1450 in the nonmetal heating mode may be set to 2 kW.

In operation S2160, the MCU 1440 may determine whether the selected heating mode corresponds to the material of the target heating object HO determined based on a difference between estimated temperature information and measured temperature information. The target heating object HO placed on the upper plate 15 of the cooktop 1400 may be replaced at any point in time based on a used situation and a material of the target heating object HO may also be changed at this time. Thus, even though the selected heating mode corresponds to the material of the target heating object HO, the selected heating mode and the material of the target heating object HO may be changed not to correspond to each other depending on a used situation of the user. The cooktop 1400 may repetitively perform operation S2160 at preset intervals to be continuously aware of whether the selected heating mode corresponds to the material of the target heating object HO.

In operation S2170, the cooktop 1400 may heat at least one of the thin film and the target heating object in the heating mode corresponding to the material of the target heating object HO. When it is determined in operation S2160 that the material of the target heating object HO does not correspond to the selected heating mode, the MCU 1440 may control the working coil 1450 to be operated in a heating mode corresponding to the material of the target heating object HO. As such, the cooktop 1400 may adaptively adjust the heating model of the working coil 1450 based on a circumstance of use of the user. Through this, a heating mode suitable for the material of the target heating object HO may be executed.

Figure 22:
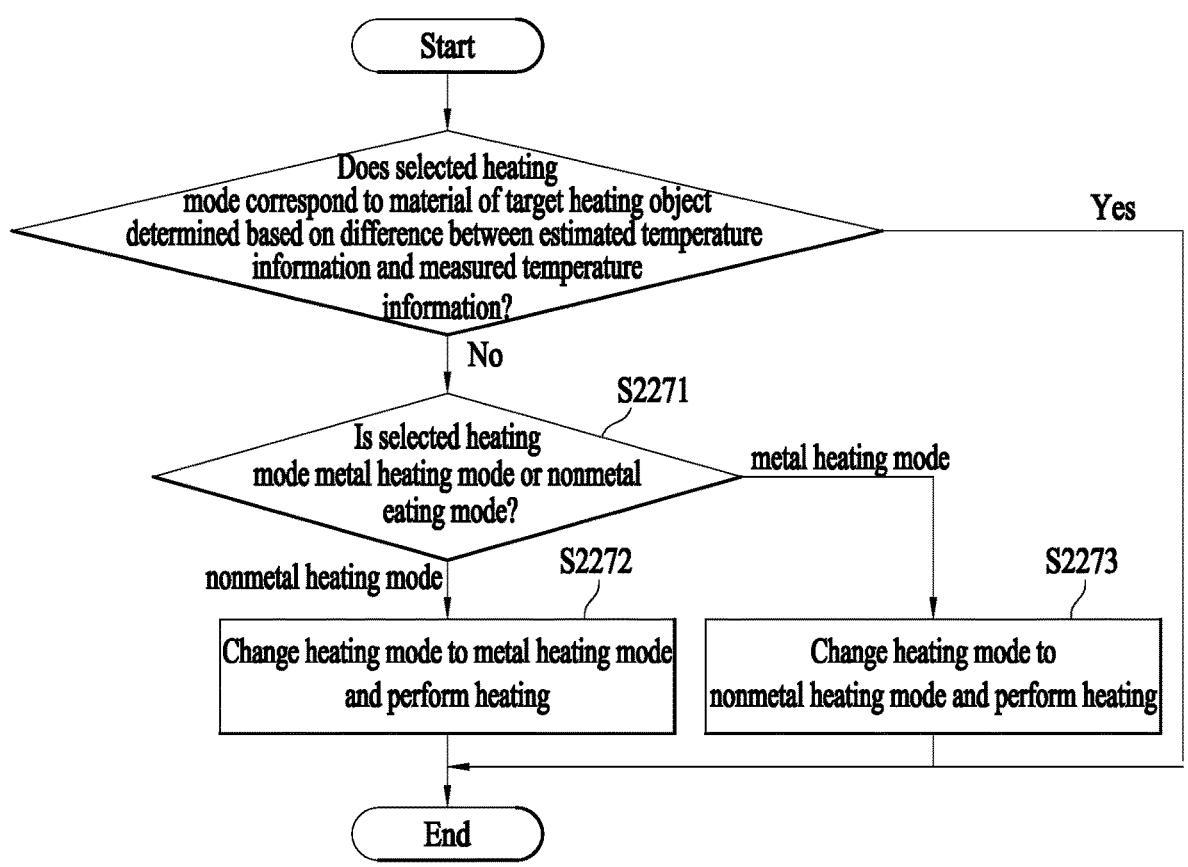
FIG. 22 is a flowchart illustrating an exemplary heating mode changing method performed by a cooktop when a selected heating mode does not correspond to a material of a target heating object HO.

FIG. 22 is a flowchart illustrating an exemplary heating mode changing method performed by the cooktop 1400 when a selected heating mode does not correspond to a material of a target heating object HO. Technical characteristics of operation S2260 of FIG. 22 may be identical or similar to the technical characteristics of operation S2160 of FIG. 21. At least a portion of operations S2110 to S2156 shown in the flowchart of FIG. 21 may be performed to reach operation S2260.

When it is determined in S2260 that a selected heating mode does not correspond to a material of the target heating object HO determined based on a difference between estimated temperature information and measured temperature information, the cooktop 1400 may determine whether the selected heating mode is a metal heating mode or a nonmetal heating mode in operation S2271. For example, the determining, by the cooktop 1400, whether the heating mode is the metal heating mode in operation S2271 may be to change the heating mode by distinguishing between a case in which the heating mode is the nonmetal heating mode and the material of the target heating object HO is a metal material and a case in which the heating mode is the metal heating mode and the material of the target heating object HO is a nonmetal material. Thus, a process in which the cooktop 1400 determines whether the selected heating mode is the metal heating mode or the nonmetal heating mode in operation S2271 may be replaced with a process of determining whether the material of the target heating object HO is the metal material or the nonmetal material. For ease and brevity, the following description will be made based on an example in which the cooktop 1400 determines whether the selected heating mode is the metal heating mode or the nonmetal heating mode in operation S2271.

When it is determined in operation S2271 that the selected heating mode is the nonmetal heating mode, in operation S2272, the cooktop 1400 may change the heating mode to the metal heating mode and heat at least one of the target heating object HO and the thin film 1420 in the metal heating mode.

When it is determined in operation S2271 that the selected heating mode is the metal heating mode, in operation S2273, the cooktop 1400 may change the heating mode to the nonmetal heating mode and heat at least one of the target heating object HO and the thin film 1420 in the nonmetal heating mode.

When it is determined in operation S2271 that the selected heating mode is the metal heating mode, in operation S2273, the cooktop 1400 may suspend heating instead of changing the heating mode to the nonmetal heating mode. Since the induction heating type cooktop 1400 on which the thin film 1420 is placed may use information on an inductor component and a resistor component of an equivalent circuit viewed from the working coil 1450, the difference between the estimated temperature information and the measured temperature information may be within a preset range in a case in which the material of the target heating object HO is the nonmetal material and a case in which the target heating object HO is not placed on the upper plate 15. Thus, to prevent a situation in which the operation is continued by changing the heating mode to the nonmetal heating mode even though the target heating object HO is not placed on the upper plate 15 (for example, when the user removes the target heating object HO from the upper plate 15 during the heating), the MCU 1440 may control the working coil 1450 to suspend heating instead of changing the heating mode to the nonmetal heating mode when it is determined in operation S2271 that the selected heating mode is the metal heating mode.

A process in which the MCU 1440 suspends heating instead of changing the heating mode to the nonmetal heating mode in operation S2273 may be performed if a predetermined condition is satisfied. For example, the heating may be suspended in a case in which an external signal instructing to continue heating with changing the heating mode to the nonmetal heating mode is not input to a user interface of the cooktop 1400 within a predetermined time, a case in which it is determined that the target heating object HO of the metal material is placed on the upper plate 15 again, or a case in which a separate container detection sensor included in the cooktop 1400 determines that the target heating object HO is not placed on the upper plate 15.

Figure 23:
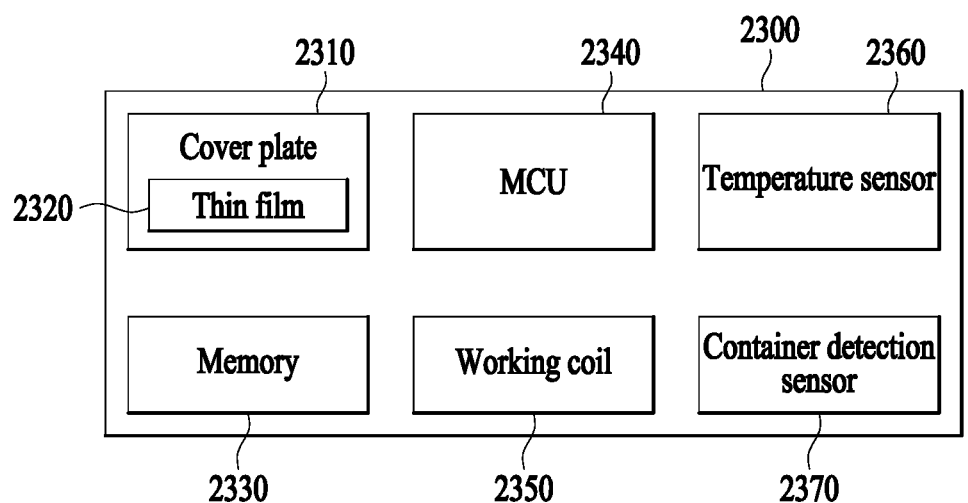
FIG. 23 is a block diagram illustrating an exemplary induction heating type cooktop that determines a material of a target heating object HO by comparing estimated temperature information and measured temperature information and controls a heating mode by recognizing whether the target heating object HO is placed.

FIG. 23 is a block diagram illustrating an example of an induction heating type cooktop 2300 that determines a material of a target heating object HO by comparing estimated temperature information and measured temperature information and controls a heating mode by recognizing whether the target heating object is placed. A cover plate 2310, a thin film 2320, a memory 2330, an MCU 2340, and a working coil 2350 of the induction heating type cooktop 2300 of FIG. 23 may correspond to the cover plate 1410, the thin film 1420, the memory 1430, the MCU 1440, and the working coil 1450 of the induction heating type cooktop 1400 of FIG. 14. Accordingly, at least a portion of the technical characteristics of the induction heating type cooktop 1400 described with respect to FIGS. 14 to 22 may apply the induction heating type cooktop 2300 of FIG. 23.

The induction heating type cooktop 2300 may include a container detection sensor 2370. The container detection sensor 2370 may acquire placement information indicating whether the target heating object HO is placed on the upper plate 15. The container detection sensor 2370 may include various types of sensors (e.g., infrared sensor, optical sensor, ultrasonic sensor, proximity sensor, etc.) capable of verifying whether an object is present based on the acquired information.

The MCU 2340 may determine whether the target heating object HO is placed on the upper plate 15 based on the placement information acquired from the container detection sensor 2370. The MCU 2340 may determine whether the target heating object HO is formed of a metal material or a nonmetal material based on estimated temperature information and measured temperature information. Based on a result of the determining, the MCU 2340 may control the working coil 2350 to operate in a heating mode suitable for a material of the target heating object HO. The MCU 2340 may control a heating mode based on whether the target heating object HO is placed on the upper plate 15. When it is determined that the target heating object HO is not placed, the MCU 2340 may control the working coil 2350 to suspend heating so as to secure the safety.

Figure 24:
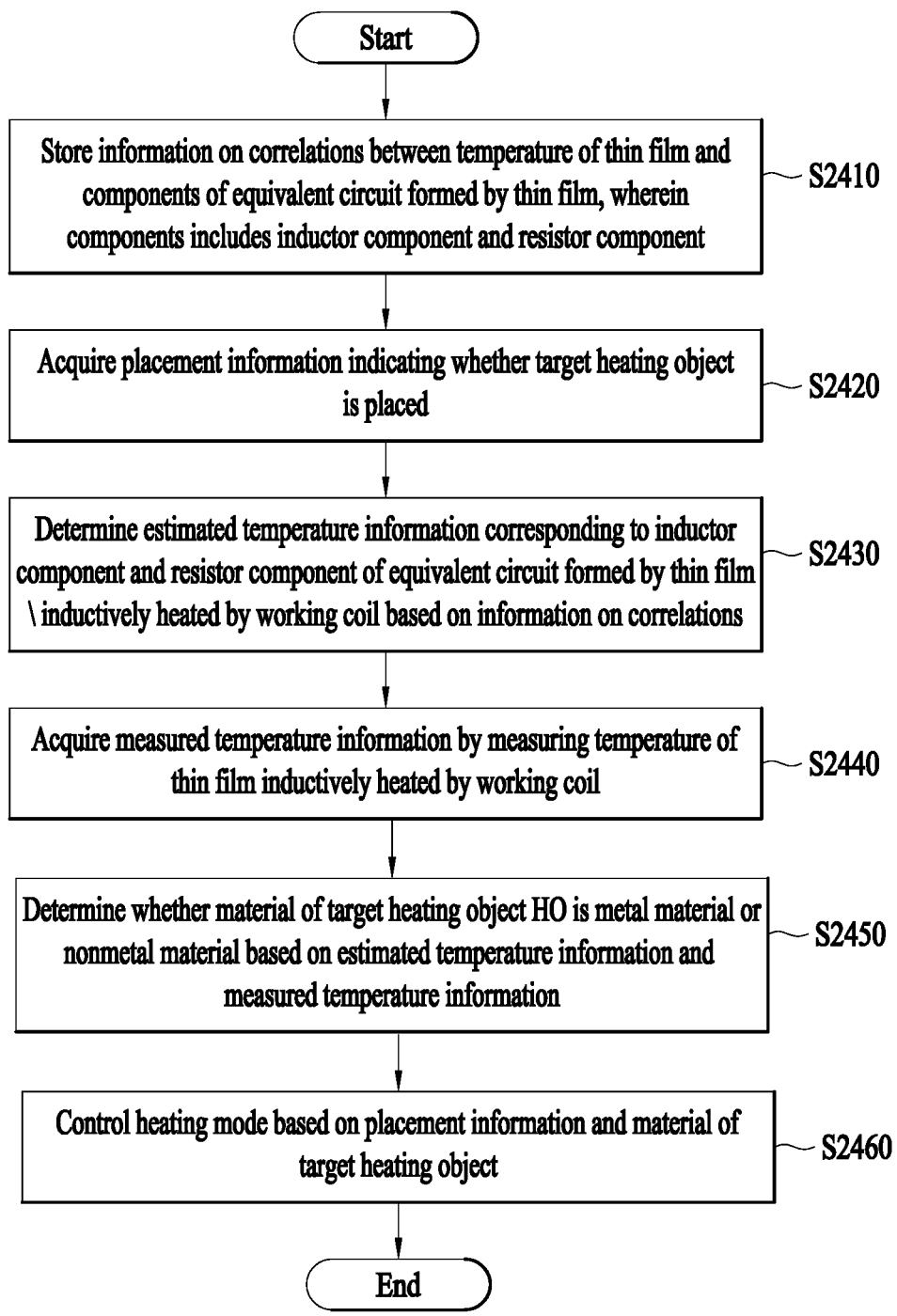
FIG. 24 is a flowchart illustrating an exemplary method of determining a material of a target heating object HO by comparing estimated temperature information and measured temperature information and controlling a heating mode by recognizing whether the target heating object HO is placed.

FIG. 24 is a flowchart illustrating an exemplary method of determining a material of a target heating object HO by comparing estimated temperature information and measured temperature information and controlling a heating mode by recognizing whether the target heating object HO is placed.

Since technical characteristics of operations S2410, S2430, S2440, and S2450 of FIG. 24 may be identical or similar to the technical characteristics of operations S1910, S1920, S1930, and S1940 of FIG. 19, redundant description will be omitted.

In operation S2420, the induction heating type cooktop 2300 may acquire, from the container detection sensor 2370, placement information indicating whether the target heating object HO is placed. Operation S2420 in which the placement information is acquired may be performed at least once at any point in time before operation S2460 is performed to control a heating mode.

In operation S2460, the induction heating type cooktop 2300 may control a heating mode based on the placement information and a material of the target heating object HO. Various methods of controlling a heating mode based on a material of the target heating object HO may be performed according to the exemplary implementations described with respect to FIGS. 19 through 22. A method of controlling a heating mode further based on placement information in addition to a material of the target heating object HO will be described with respect to various implementations below.

Figure 25:
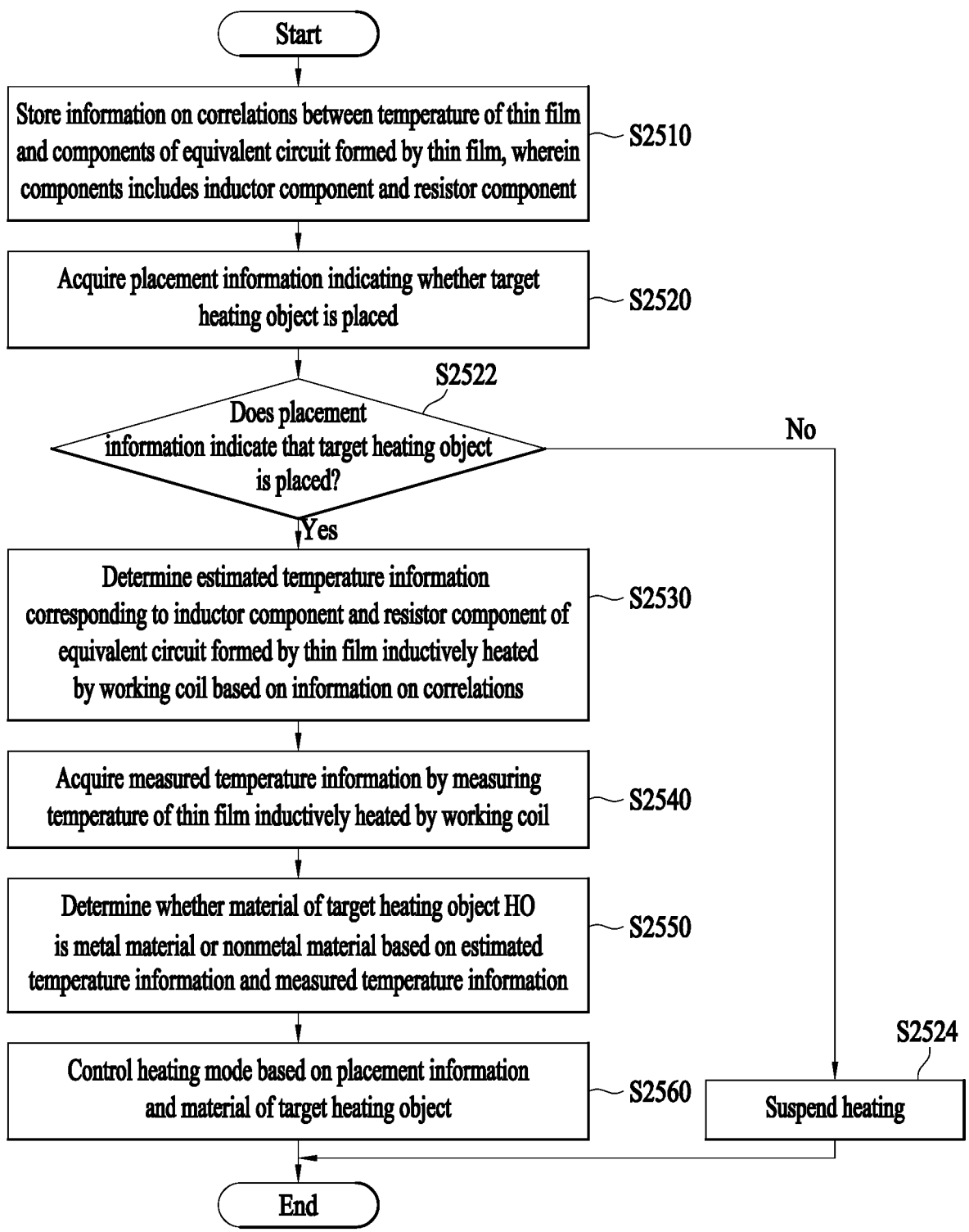
FIG. 25 is a flowchart illustrating an exemplary method of recognizing whether a target heating object HO is placed and suspending heating.

FIG. 25 is a flowchart illustrating an exemplary method of recognizing whether a target heating object HO is placed and suspending heating according to an example embodiment.

Since technical characteristics of operations S2510, S2520, S2530, S2540, S2550, and S2560 of FIG. 25 may be identical or similar to the technical characteristics of operations S2410, S2420, S2430, S2440, S2450, and S2460 of FIG. 24, redundant description will be omitted.

In operation S2522, the cooktop 2300 may determine whether the target heating object HO is placed based on placement information acquired in operation S2520.

When the placement information indicates that the target heating object HO is not placed, in operation S2524, the MCU 2340 may control the working coil 2350 to suspend heating.

When the placement information indicates that the target heating object HO is placed, an MCU 2540 may control a heating mode based on the placement information and a material of the target heating object through operations S2530 through S2560.

When the placement information indicates that the target heating object HO is placed, the MCU 2540 may control a heating mode of a working coil 2550 based on a material of the target heating object HO. For example, the MCU 2540 may control a heating mode based on a material of the target heating object HO only when it is determined that the target heating object HO is placed on the upper plate 15 based on a time at which a container detection sensor 2570 detects a container.

When the placement information indicates that the target heating object HO is placed, the MCU 2540 may determine whether a difference D between estimated temperature information and measured temperature information is within a preset range. When the difference D is within the preset range (e.g., if D≤TH3), the MCU 2540 may determine that a material of the placed target heating object HO is a nonmetal material. When the difference D is not within the preset range (e.g., if D>TH3), the MCU 2540 may determine that a material of the target heating object HO is a metal material.

The MCU 2540 may control the working coil 2550 to heat at least one of a thin film 2520 or the target heating object HO in a heating mode selected based on whether the material of the target heating object HO is the metal material or the nonmetal material. The MCU 2540 may control the working coil 2550 to operate in a heating mode corresponding to the material of the target heating object HO.

The MCU 2540 may control the working coil 2550 to heat at least one of the thin film 2520 and the target heating object HO in a heating mode selected from a plurality of heating modes based on a preset condition.

The plurality of heating modes may include a metal heating mode and a nonmetal heating mode. The MCU 2540 may control the working coil 2550 to operate at a higher output in the metal heating mode in comparison to the nonmetal heating mode.

A heating mode of the working coil 2550 may be determined based on a preset condition. The preset condition may be at least one of various conditions including a material of a currently placed target heating object HO, whether an external signal for selecting a heating mode is received, or the like. A user may input an external signal for selecting a heating mode, to the cooktop 2500 through a user interface.

For example, a heating mode selected based on the external signal may not correspond to a material of the target heating object HO determined based on a difference between the estimated temperature information and the measured temperature information. By way of example, the MCU 2540 may control the working coil 2550 to operate in a heating mode corresponding to the material of the target heating object HO. When such process of changing heating modes is performed, the cooktop 2500 may use an output part to output visual or auditory information indicating that the heating mode is changed.

Figure 26:
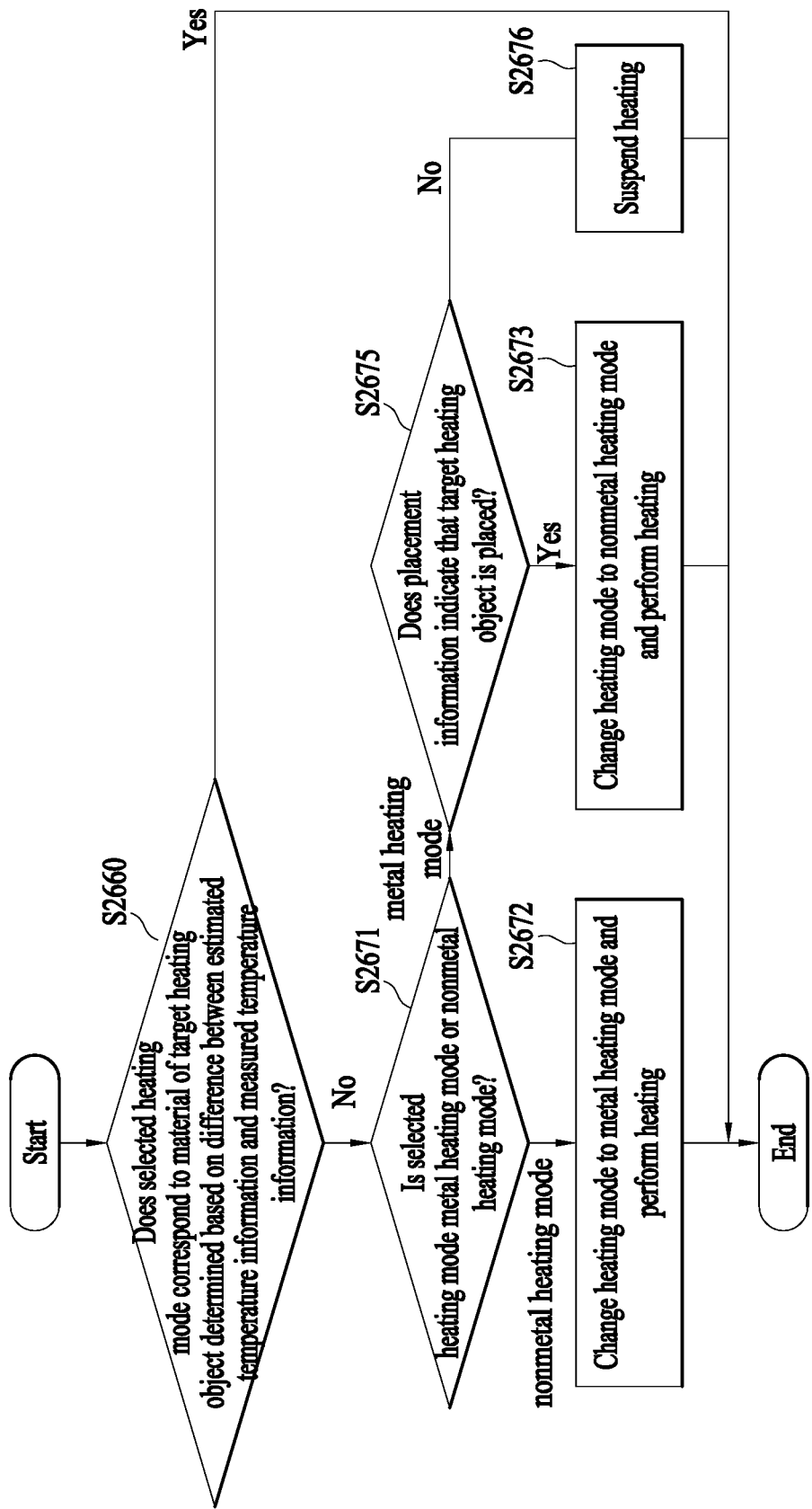
FIG. 26 is a flowchart illustrating an exemplary method of controlling a heating mode based on placement information and a selected heating mode when a material of a target heating object HO does not correspond to the selected heating mode.

FIG. 26 is a flowchart illustrating an exemplary method of controlling a heating mode based on placement information and a selected heating mode when a material of a target heating object HO does not correspond to the selected heating mode. Operation S2660 of FIG. 26 may correspond to operation S2650 of FIG. 25. Accordingly, at least a portion of operations earlier than operation S2650 of FIG. 25 may be performed before operations of FIG. 26 are performed.

When it is determined in operation S2660 that a selected heating mode corresponds to a material of a target heating object determined based on a difference between estimated temperature information and measured temperature information, the cooktop 2500 may maintain a heating mode without changing.

When it is determined in operation S2660 that a selected heating mode does not correspond to the material of the target heating object determined based on the difference between the estimated temperature information and the measured temperature information, the cooktop 2500 may determine whether the selected heating object is a metal heating mode or a nonmetal heating mode in operation S2671. A process in which the cooktop 2500 determines whether the selected heating mode is the metal heating mode or the nonmetal heating mode in operation S2671 may be replaced with a process of determining whether a material of a target heating object HO is a metal material or a nonmetal material. Based on a result of the determination in operation S2671, the cooktop 2500 may differently control the heating mode based on whether the material of the place target heating object HO is the metal material or the nonmetal material.

When the nonmetal heating mode is selected based on the preset condition, and when the metal material is determined as the material of the target heating object HO based on the difference between the estimated temperature information and the measured temperature information, in operation S2672, the MCU 2540 may control the working coil 2550 to perform the heating by changing a heating mode to the metal heating mode.

When the metal heating mode is selected based on the preset condition, and when the nonmetal material is determined as the material of the target heating object HO based on the difference between the estimated temperature information and the measured temperature information, in operation S2675, the MCU 2540 may determine whether placement information indicates that the target heating object HO is placed. For example, when the cooktop 2500 recognizes that the target heating object HO is placed based on placement information acquired using the container detection sensor 2570, the cooktop 2500 may determine a material of the target heating object HO and select a heating mode corresponding to the material. Thereafter, the cooktop 2500 may recognize that the selected heating mode does not correspond to the material of the target heating object HO (e.g., due to an elimination of the target heating object HO during the heating or a placement of a target heating object HO formed of another material). Since the thin film 2520 for induction heating is disposed on the upper plate 15 of the cooktop 2500, electrical parameters (e.g., a resistor component and an inductor component) of equivalent circuits to be recognized by the cooktop 2500 in a case in which the target heating object HO of the nonmetal material is placed and a case in which the target heating object HO is not placed may be similar or identical. Thus, based only on the electrical parameters of the equivalent circuit recognized by the cooktop 2500, it may be difficult to distinguish whether the target heating object HO of the nonmetal material is placed or the target heating object HO is not placed.

The cooktop 2500 may acquire placement information indicating whether the target heating object HO is placed through the container detection sensor 2570 again in operation S2675, thereby distinguishing whether the target heating object HO of the nonmetal material is placed or the target heating object HO is not placed.

When the placement information acquired in operation S2675 indicates that the target heating object HO is placed, in operation S2673, the MCU 2540 may control the working coil 2550 to heat by changing a heating mode to the metal heating mode.

When the placement information acquired in operation S2675 indicates that the target heating object HO is not placed, in operation S2676, the MCU 2540 may control the working coil 2550 to suspend heating. As such, the cooktop 2500 may prevent a situation in which the heating is continued even in an absence of the target heating object HO, thereby ensuring the stability of use.

In some implementations of the present disclosure, it is possible to measure a temperature in a range to a high temperature, which is difficult to be measured by a typical temperature sensor, thereby securing a stability.

In some implementations of the present disclosure, it is possible to heat a target heating object at a high temperature so that efficiency and convenience of use are secured.

In some implementations of the present disclosure, it is possible to perform temperature estimation in a state being driven at a predetermined frequency during heating. Through this, it is possible to estimate a temperature without substantial degradation in output in a state in which a user is not aware of a change in frequency during operation of a working coil, thereby securing a convenience of use.

In some implementations of the present disclosure, it is possible to reduce costs by excluding a temperature sensor used in related arts, which is an unnecessary physical component.

The foregoing description of the present disclosure is not limited to the aforementioned implementations and the accompanying drawings, and it will be obvious to those skilled in the technical field to which the present disclosure pertains that various substitutions, modifications, and changes may be made within the scope without departing from the technical spirit of the present disclosure.

What is claimed is:

1. An induction heating cooktop comprising:
   a case;
   a cover plate coupled to a top of the case and having an upper plate that is configured to support a target object;
   a thin film disposed on a top of the upper plate, a bottom of the upper plate, or a combination of both and configured be inductively heated by a working coil based on a material of the target object, the working coil being provided in the case and configured to inductively heat the thin film, the target object, or a combination of both;
   a memory storing information on one or more correlations between (i) a temperature of the thin film and (ii) an inductor component and a resistor component of an equivalent circuit, the equivalent circuit being formed by the thin film based on the thin film being inductively heated by the working coil; and
   a controller configured to operate the working coil and determine estimated temperature information corresponding to the inductor component and the resistor component of the equivalent circuit,
   wherein the controller is configured to determine an estimated temperature associated with the determined estimated temperature information as a current temperature of the thin film based on the information on the one or more correlations without using a temperature sensor measuring the temperature of the thin film, and
   wherein a thickness of the thin film is less than a skin depth of the thin film to thereby allow a magnetic field of the working coil to pass through the thin film and reach the target object.

2. The induction heating cooktop of claim 1, wherein the controller is configured to determine the current temperature of the thin film after the working coil operating at a first frequency is controlled to operate at a preset second frequency to heat at least one of the thin film or the target object at a configured output level.

3. The induction heating cooktop of claim 2, wherein the controller is configured, based on a predetermined time being elapsed while the working coil is operated at the first frequency, to control the working coil to be operated at the preset second frequency and determine the current temperature of the thin film.

4. The induction heating cooktop of claim 3, wherein the controller is configured, based on a predetermined number of periods of an input voltage of the working coil being elapsed while the working coil is operated by the input voltage, to control the working coil to be operated at the preset second frequency.

5. The induction heating cooktop of claim 1, wherein the controller is configured to change a standby state, in which a predetermined current flows in the working coil, to a self resonance state and determine the current temperature of the thin film based on an attenuation width and a resonant frequency of current measured from the working coil in the self resonance state.

6. The induction heating cooktop of claim 5, wherein the controller is configured to determine the current temperature of the thin film based on the estimated temperature information corresponding to the inductor component determined based on the resonant frequency.

7. The induction heating cooktop of claim 5, wherein the controller is configured to determine the current temperature of the thin film based on the estimated temperature information corresponding to the resistor component determined based on the attenuation width.

8. The induction heating cooktop of claim 5, wherein the controller is configured to allow preset current having a constant value in the standby state to flow in the working coil.

9. The induction heating cooktop of claim 5, wherein the controller is configured to control the working coil to enter the self resonance state from the standby state before the working coil is operated at a frequency corresponding to a configured output level.

10. The induction heating cooktop of claim 1, wherein the memory is configured to store the information on the one or more correlations based on the thickness of the thin film, a frequency at which the working coil is operated, or a combination of both.

11. The induction heating cooktop of claim 1, wherein the target object is provided with a non-metal material.

12. The induction cooktop of claim 1, wherein the working coil is configured to:
   based on the target object being a magnetic material and supported by the upper plate, inductively heat the magnetic object by the magnetic field that passes through the thin film and that is transmitted to the magnetic object through the thin film, and
   based on the target object being a non-magnetic material and supported by the upper plate, inductively heat the thin film by the magnetic field that is delivered to the thin film to thereby heat the non-magnetic material by the heated thin film.

* * * * *